United States Patent
Takeuchi

(10) Patent No.: US 11,546,873 B2
(45) Date of Patent: Jan. 3, 2023

(54) OBJECT QUANTITY ESTIMATION SYSTEM, OBJECT QUANTITY ESTIMATION METHOD, PROGRAM, AND RECORDING MEDIUM

(71) Applicant: NEC Corporation, Tokyo (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/972,786

(22) PCT Filed: May 10, 2019

(86) PCT No.: PCT/JP2019/018696
§ 371 (c)(1),
(2) Date: Dec. 7, 2020

(87) PCT Pub. No.: WO2019/239756
PCT Pub. Date: Dec. 19, 2019

(65) Prior Publication Data
US 2021/0227486 A1     Jul. 22, 2021

(30) Foreign Application Priority Data
Jun. 13, 2018 (JP) .............................. JP2018-112965

(51) Int. Cl.
*H04W 64/00* (2009.01)
(52) U.S. Cl.
CPC .................................. *H04W 64/00* (2013.01)
(58) Field of Classification Search
CPC . H04W 16/32; H04W 24/08; H04W 36/0079; H04W 36/00835; H04W 36/04;
(Continued)

(56) References Cited

U.S. PATENT DOCUMENTS 5,459,665 A * 10/1995 Hikita ................... B66B 1/2408
706/910
6,553,269 B1 * 4/2003 Hikita ................... B66B 1/2458
700/48
(Continued)

FOREIGN PATENT DOCUMENTS

JP   2005-292942 A   10/2005
JP   2012-029227 A    2/2012
(Continued)

OTHER PUBLICATIONS

International Search Report for PCT Application No. PCT/JP2019/018696, dated Aug. 6, 2019.
(Continued)

*Primary Examiner* — Joseph Arevalo
(74) *Attorney, Agent, or Firm* — Sughrue Mion, PLLC

(57) ABSTRACT

An object quantity estimation system 100 includes: a terminal path estimation unit 20 configured to estimate the traveling paths of wireless terminals; an actual quantity-of-people counting unit 30 configured to count the actual quantity of people that are located in each of the fixed points; a terminal detection rate calculation unit 40 configured to calculate the terminal detection rate that indicates a relationship between the quantity of the wireless terminals and the actual quantity of people, for each of the fixed points; and an actual quantity-of-people estimation unit 50 configured to determine priorities of the traveling paths, each of which passes at least one of the fixed points, and sequentially estimate the actual quantity of people having traveled on each traveling path, in descending order of the priorities of the traveling paths, based on the terminal detection rates.

12 Claims, 13 Drawing Sheets

(58) Field of Classification Search
CPC ............. H04W 28/0289; H04W 36/22; H04W 36/305
USPC .............................. 455/456.1, 424, 500, 519
See application file for complete search history.

(56) References Cited

U.S. PATENT DOCUMENTS

| | | | |
|---|---|---|---|
| 2014/0274097 A1* | 9/2014 | Chen ..................... | H04W 72/06 |
| | | | 455/452.1 |
| 2016/0379049 A1* | 12/2016 | Yu ........................ | G06K 9/6298 |
| | | | 382/103 |
| 2017/0017846 A1* | 1/2017 | Felemban ............. | G06K 9/4642 |
| 2017/0289984 A1* | 10/2017 | Baligh .................. | H04L 1/1812 |
| 2019/0049253 A1* | 2/2019 | Kitamura .................. | G08G 1/01 |
| 2019/0104596 A1* | 4/2019 | Den Hartog ........... | H05B 47/12 |
| 2019/0122228 A1 | 4/2019 | Konishi | |
| 2020/0050873 A1* | 2/2020 | Ikeda ............... | G08B 13/19673 |
| 2020/0269809 A1* | 8/2020 | Sanji ....................... | B60R 25/31 |
| 2020/0304967 A1* | 9/2020 | Kuriyama ............... | H04L 47/33 |
| 2021/0163010 A1* | 6/2021 | Takabayashi ......... | B60W 40/02 |
| 2021/0218681 A1* | 7/2021 | Bustamante ........ | H04L 47/2416 |

FOREIGN PATENT DOCUMENTS

| | | |
|---|---|---|
| JP | 2013-210870 A | 10/2013 |
| WO | 2017/183547 A1 | 10/2017 |

OTHER PUBLICATIONS

NTT Docomo, Mobile Spatial Statistics, [May 24, 2018 Search], Internet <URL:https://www.nttdocomo.co.jp/biz/service/spatial_statistics/function/>, Japan.
English translation of Written opinion for PCT Application No. PCT/JP2019/018696, dated Aug. 6, 2019.

* cited by examiner

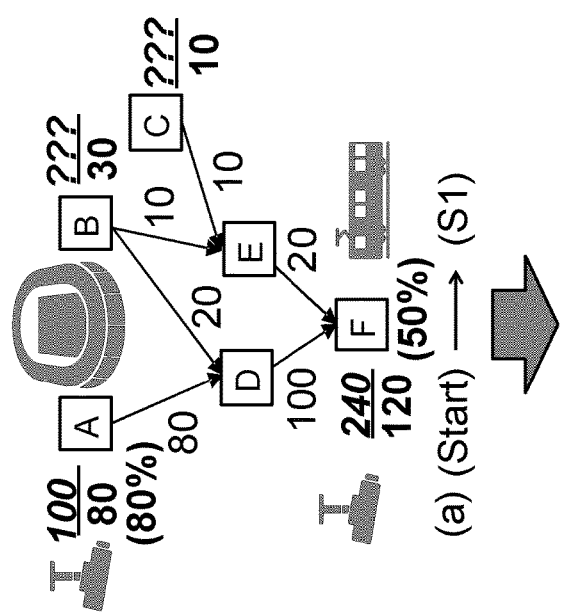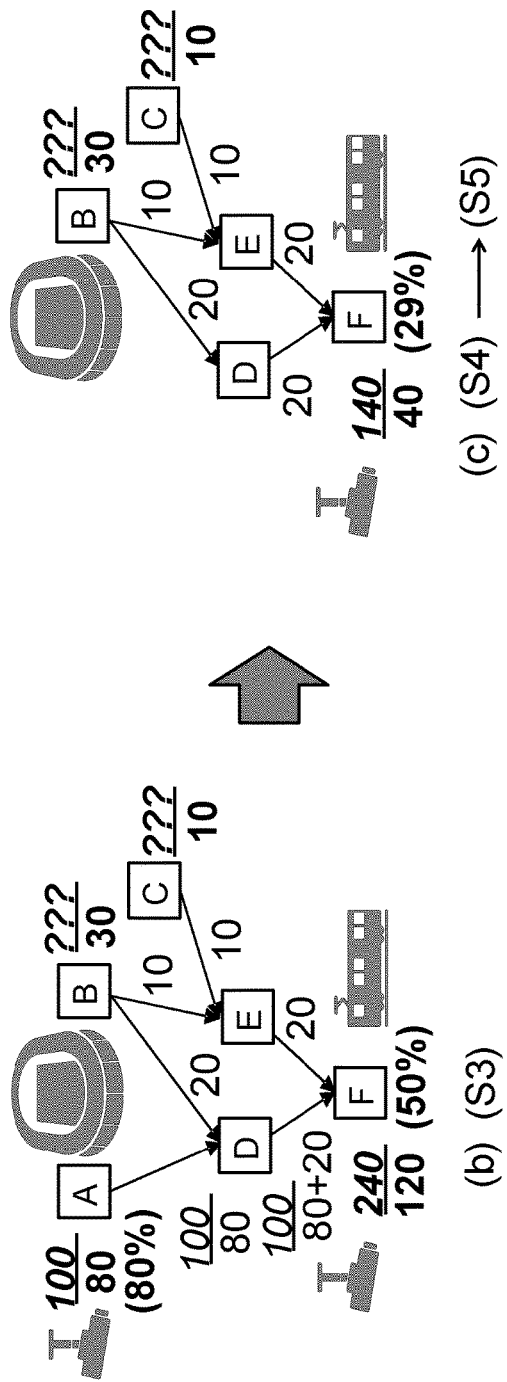
Fig. 5

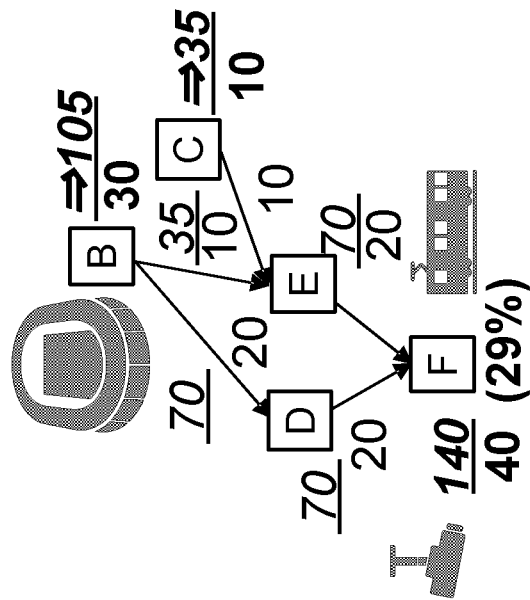
(b) (S3)
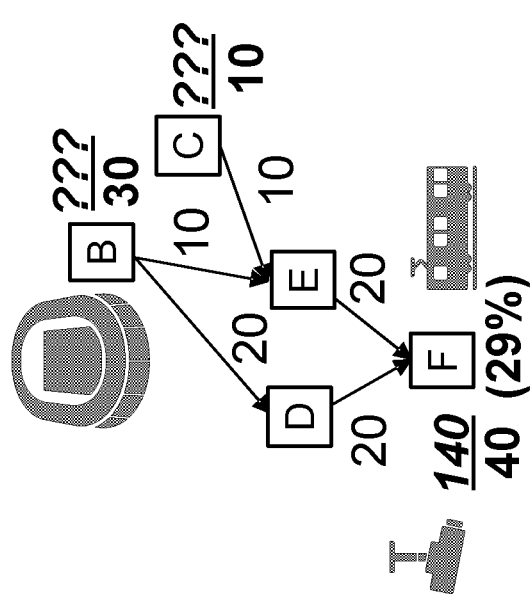
(a) (S1)
Fig. 6

$A=100, B=105, C=35$ ARE ESTIMATED $$\text{ESTIMATION ERROR} = \frac{0+15+15}{240} = \underline{12.5\%}$$

EXAMPLE OF ESTIMATION ERROR

EXAMPLES OF CORRECT VALUES OF THIS CASE

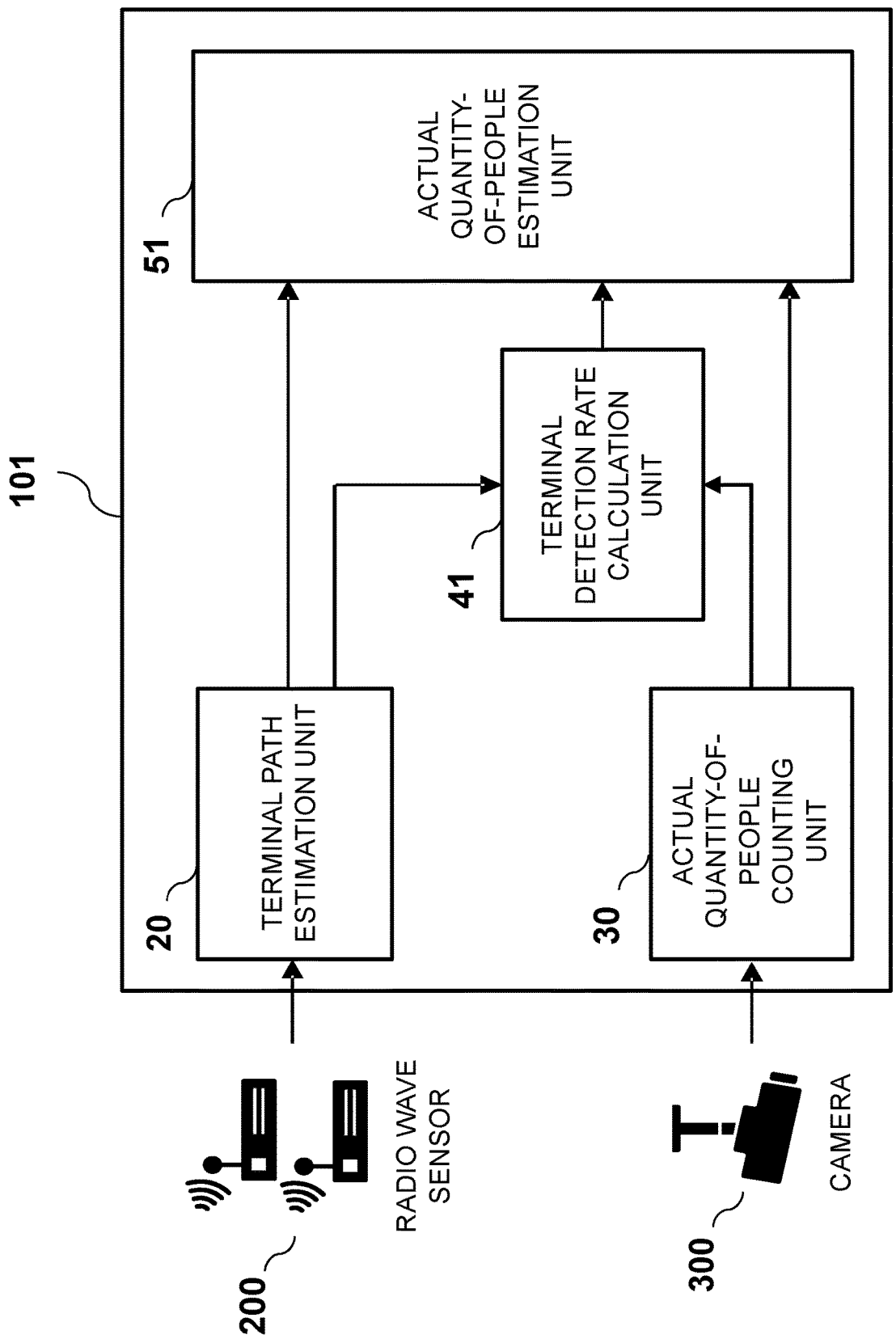

Fig. 11
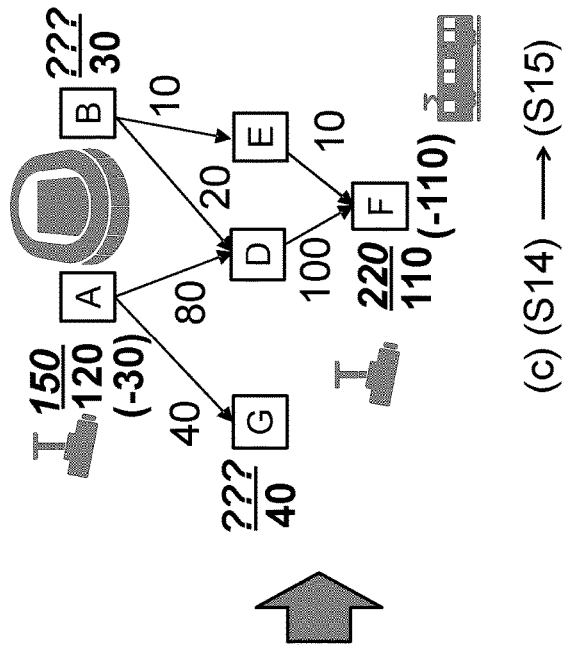
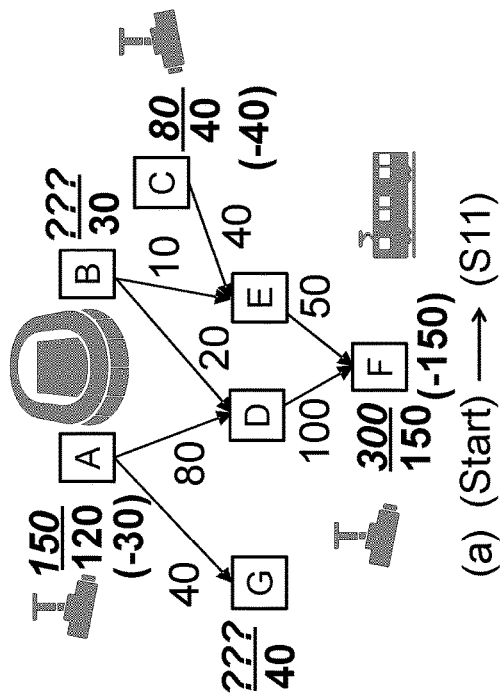
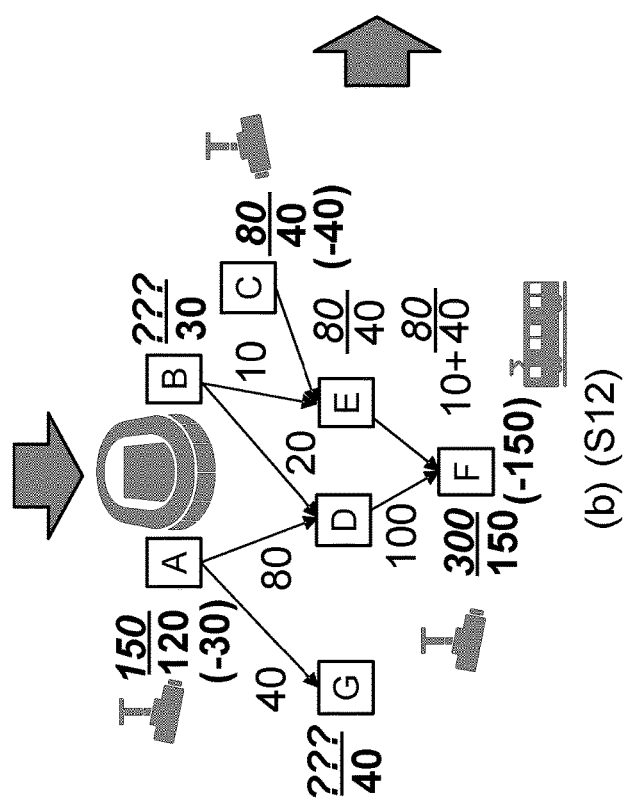

OBJECT QUANTITY ESTIMATION SYSTEM, OBJECT QUANTITY ESTIMATION METHOD, PROGRAM, AND RECORDING MEDIUM

This application is a National Stage Entry of PCT/JP2019/018696 filed on May 10, 2019, which claims priority from Japanese Patent Application 2018-112965 filed on Jun. 13, 2018, the contents of all of which are incorporated herein by reference, in their entirety.

BACKGROUND

Technical Field

The present invention relates to an object quantity estimation system, an object quantity estimation method, a program, and a recoding medium for estimating the quantity of objects, such as the actual quantity of people, the quantity of things and so forth.

Background Art

Conventionally, systems have been proposed that use a variety of sensors such as cameras, radars, radio wave sensors, acoustic sensors and so forth, to detect and identify objects (including people) and wireless terminals, and to estimate and track the locations of these objects and terminals.

To be more specific, for example, a system for analyzing the quantity of people who have wireless terminals with them, the flow of such people and so forth, from the quantity of wireless terminals, their location information and so forth, which are acquired using radio wave sensors and mobile base stations, has been proposed. Here, not all the people or things in the area actually have these wireless terminals with them (terminals that are compatible with wireless schemes acquired via radio wave sensors or base stations, and that are in status to allow their communication status to be learned). Consequently, it is necessary to estimate the actual quantity of people and the quantity of things by using some method.

For example, wireless schemes to use mobile phone networks such as 2G (GSM (registered trademark), PDC, etc.), 3G (W-CDMA), 4G (LTE, LTE-Advanced, etc.) and 5G, and wireless schemes to use public wireless networks such as wireless LAN (Wi-Fi), Bluetooth (registered trademark), Wi-SUN, Zigbee and LPWA may be examples of wireless schemes.

Also, as for the method of estimating the actual quantity of people and quantity of things, a number of related arts have been proposed.

For example, Non-Patent Literature 1 discloses a system that detects the quantity of contracted terminals at a given time or in a given area, and estimates the actual quantity of people at that time or in that area from the proportion of the quantity of contracted users, the rate of spread, and so forth, compared to the total population. A system like this has the advantage that the actual quantity of people can be estimated only by detecting contracted terminals that can be accommodated and acquired.

Furthermore, Patent Literature 1 discloses a system, which multiplies the quantity of location registration occurrences detected, by the probability distribution values at times before and after the occurrence time zones corresponding to the quantity of occurrences, thereby estimating the distribution of the quantity of people corresponding to the location registrations that occurred during the occurrence time zones. A system like this has the advantage that, even if users move in a time shorter than the cycle of location registration, changes of the quantity of users over time reflecting such tendency of movement can be acquired.

Furthermore, Patent Literature 2 discloses a system that warns whether or not there is an intruder, by comparing the quantity of monitoring targets counted based on image data photographed by a photographing means with the quantity of mobile terminals counted by a terminal counting unit by communicating via a terminal communication unit. By this means, it is possible to distinguish between qualified entrants and intruders, and enable security even at times people are present.

Furthermore, Patent Literature 3 discloses estimating, based the quantity of moving identified objects that are easy to be identified individually, and the ratio of identified objects and unidentified objects per area, the total quantity of identified objects that have moved from the first area to the second area, and second unidentified objects.

CITATION LIST

Patent Literature

[PTL 1] JP 2012-029227 A
[PTL 2] JP 2005-292942 A
[PTL 3] WO 2017/183547

Non-Patent Literature

[NPL 1] MOBILE SPATIAL STATISTICS, NTT Docomo, [May 24, 2018 Search], Internet <URL: https://www.ntt-docomo.co.jp/biz/service/spatial_statistics/function/>

SUMMARY

Technical Problem

However, ratios/proportions such as the ratio of the quantity of wireless terminals to the quantity of objects present in an area are not necessarily fixed in all places and time zones. Consequently, for example, there is a problem that, if the quantity of objects (for example, the quantity of people) is estimated at a certain magnification based on the rate of ownership, the rate of spread and so forth, the accuracy of estimation may be deteriorated significantly.

Furthermore, for example, the problem with the art disclosed in Patent Literature 3 is that, in the event there is an area in which identified objects cannot be identified and "focused data" is selected during the process of estimating the flow rate of people that move between areas (in S142, for example), the result of estimation changes depending on the order of selection (order of processing), and the performance of estimation may be significantly deteriorated depending on the order of processing (or the quantity of people (the total quantity of moves) does not make sense).

It is therefore an example object of the present invention to provide an object quantity estimation system, an object quantity estimation method, a program, and a recoding medium that can estimate the quantity of objects with high accuracy even if there is an area where the count of the quantity of objects is small.

Solution to Problem

An object quantity estimation system according to one example aspect of the present invention includes a terminal path estimation unit configured to estimate information related to traveling paths of wireless terminals, an object quantity counting unit configured to count a quantity of objects that are located in each of a plurality of fixed points, a terminal detection rate calculation unit configured to calculate a terminal detection rate that indicates a relationship between a quantity of the wireless terminals and the quantity of objects, based on the information related to the traveling paths of the wireless terminals, for each of the plurality of fixed points, and an object quantity estimation unit configured to determine priorities of the traveling paths, each of which passes at least one of the plurality of fixed points, and sequentially estimate the quantity of objects having traveled on each traveling path, in descending order of the priorities of the traveling paths, based on the terminal detection rates.

An object quantity estimation method according to one example aspect of the present invention includes estimating information related to traveling paths of wireless terminals, counting a quantity of objects that are located in each of a plurality of fixed points, calculating a terminal detection rate that indicates a relationship between a quantity of the wireless terminals and the quantity of objects, based on the information related to the traveling paths of the wireless terminals, for each of the plurality of fixed points, and determining priorities of the traveling paths, each of which passes at least one of the plurality of fixed points, and sequentially estimating the quantity of objects having traveled on each traveling path, in descending order of the priorities of the traveling paths, based on the terminal detection rates.

A program according to one example aspect of the present invention causes a processor to execute estimating information related to traveling paths of wireless terminals, counting a quantity of objects that are located in each of a plurality of fixed points, calculating a terminal detection rate that indicates a relationship between a quantity of the wireless terminals and the quantity of objects, based on the information related to the traveling paths of the wireless terminals, for each of the plurality of fixed points, and determining priorities of the traveling paths, each of which passes at least one of the plurality of fixed points, and sequentially estimating the quantity of objects having traveled on each traveling path, in descending order of the priorities of the traveling paths, based on the terminal detection rates.

A recording medium according to one example aspect of the present invention is a non-transitory computer-readable recording medium storing a program that causes a processor to execute, estimating information related to traveling paths of wireless terminals, counting a quantity of objects that are located in each of a plurality of fixed points, calculating a terminal detection rate that indicates a relationship between a quantity of the wireless terminals and the quantity of objects, based on the information related to the traveling paths of the wireless terminals, for each of the plurality of fixed points, and determining priorities of the traveling paths, each of which passes at least one of the plurality of fixed points, and sequentially estimating the quantity of objects having traveled on each traveling path, in descending order of the priorities of the traveling paths, based on the terminal detection rates.

Advantageous Effects of Invention

According to the present invention, it is possible to estimate the quantity of objects with high accuracy even if there is an area where the count of the quantity of objects is small. Note that, according to the present invention, instead of, or together with, this advantageous effect, other advantageous effects may be brought about.

BRIEF DESCRIPTION OF THE DRAWINGS

FIG. 5 is a diagram to show a specific image of processes in the quantity-of-people estimation system 100 (the actual quantity-of-people estimation unit 50);

FIG. 6 is a diagram to show a specific image of processes in the quantity-of-people estimation system 100 (the actual quantity-of-people estimation unit 50);

FIG. 8 is a diagram to show an overall configuration of a quantity-of-people estimation system 101 according to a second example embodiment;

FIG. 11 is a diagram to show a specific image of processes in the quantity-of-people estimation system 101 (the actual quantity-of-people estimation unit 51);

DESCRIPTION OF THE EXAMPLE EMBODIMENTS

Figure 1:
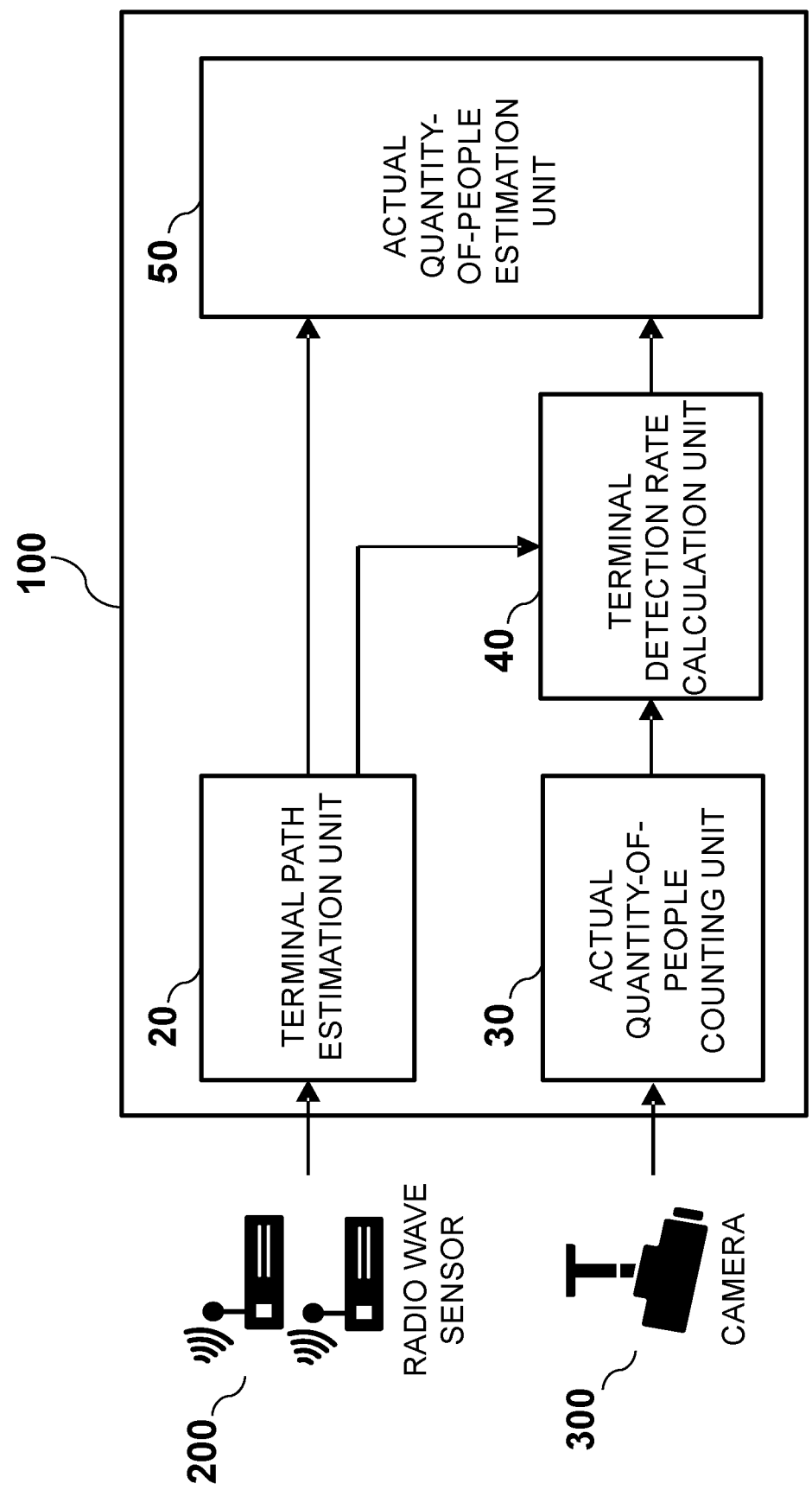
FIG. 1 is a diagram to show an overall configuration of a quantity-of-people estimation system 100 according to a first example embodiment.

Hereinafter, example embodiments of the present invention will be described in detail with reference to the accompanying drawings. Note that, in the Specification and drawings, elements that can be described in the same or similar terms will be assigned the same reference signs, and overlapping description may be omitted.

The description will be given in the following order:
1. Summary of Example Embodiments of the Present Invention
2. First Example Embodiment
3. Second Example Embodiment
4. Third Example Embodiment
5. Advantageous Effects of Example Embodiments
6. Other Embodiments

1. Summary of Example Embodiments of the Present Invention

First, a summary of example embodiments of the present invention will be described below.

(1) Technical Issues

Conventionally, systems have been proposed that use a variety of sensors such as cameras, radars, radio wave sensors, acoustic sensors and so forth, to detect and identify objects (including people) and wireless terminals, and to estimate and track the locations of these objects and terminals.

To be more specific, for example, a system for analyzing the quantity of people who have wireless terminals with them, the flow of such people and so forth, from the quantity of wireless terminals, their location information and so forth, which are acquired using radio wave sensors and mobile base stations, has been proposed. Here, not all the people or things in the area actually have these wireless terminals with them (terminals that are compatible with wireless schemes acquired via radio wave sensors or base stations, and that are in status to allow their communication status to be learned). Consequently, it is necessary to estimate the actual quantity of people and the quantity of things by using some method.

For example, wireless schemes to use mobile phone networks such as 2G (GSM (registered trademark), PDC, etc.), 3G (W-CDMA), 4G (LTE, LTE-Advanced, etc.) and 5G, and wireless schemes to use public wireless networks such as wireless LAN (Wi-Fi), Bluetooth (registered trademark), Wi-SUN, Zigbee and LPWA may be examples of wireless schemes.

Also, as for the method of estimating the actual quantity of people and quantity of things, a number of related arts have been proposed.

For example, Non-Patent Literature 1 discloses a system that detects the quantity of contracted terminals at a given time or in a given area, and estimates the actual quantity of people at that time or in that area from the proportion of the quantity of contracted users, the rate of spread, and so forth, compared to the total population. A system like this has the advantage that the actual quantity of people can be estimated only by detecting contracted terminals that can be accommodated and acquired.

Furthermore, Patent Literature 1 discloses a system, which multiplies the quantity of location registration occurrences detected, by the probability distribution values at times before and after the occurrence time zones corresponding to the quantity of occurrences, thereby estimating the distribution of the quantity of people corresponding to the location registrations that occurred during the occurrence time zones. A system like this has the advantage that, even if users move in a time shorter than the cycle of location registration, changes of the quantity of users over time reflecting such tendency of movement can be acquired.

Furthermore, Patent Literature 2 discloses a system that warns whether or not there is an intruder, by comparing the quantity of monitoring targets counted based on image data photographed by a photographing means with the quantity of mobile terminals counted by a terminal counting unit by communicating via a terminal communication unit. By this means, it is possible to distinguish between qualified entrants and intruders, and enable security even at times people are present.

Furthermore, Patent Literature 3 discloses estimating, based the quantity of moving identified objects that are easy to be identified individually, and the ratio of identified objects and unidentified objects per area, the total quantity of identified objects that have moved from the first area to the second area, and second unidentified objects.

However, ratios/proportions such as the ratio of the quantity of wireless terminals to the quantity of objects present in an area are not necessarily fixed in all places and time zones. Consequently, for example, there is a problem that, if the quantity of objects (for example, the quantity of people) is estimated at a certain magnification based on the rate of ownership, the rate of spread and so forth, the accuracy of estimation may be deteriorated significantly.

To give an example in which the rate of detecting terminals varies from place to place or time zone to time zone, for example, assuming an airport, the percentage of domestic citizens using LTE, which is their domestic carrier, is high on the domestic terminal, and the percentage of foreigners using Wi-Fi, which is only for the airport, is high on the international terminal. In this case, if LTE is detected as the wireless scheme for acquiring terminal detection rates, the terminal detection rate is high on the domestic terminal and low on the international terminal. By contrast with this, if Wi-Fi is detected as the wireless scheme for acquiring terminal detection rates, the terminal detection rate is higher on the international terminal than on the domestic terminal.

Also, to illustrate another example in which the terminal detection rate varies from place to place or time zone to time zone, assuming event venues such as stadiums and concert halls, the terminal detection rate (wireless terminal usage rate upon entry/exit) may increase on the home side and at member-only entrance/exit gates because of the operation of member-only applications, and the terminal detection rate may become relatively low on the away side and at general entrance/exit gates.

As described above, Non-Patent Literature 1 discloses a system that estimates the actual quantity of people at a given time or in a given area from the proportion of the quantity of contracted users, the rate of spread, and so forth, compared to the total population. However, assuming that the terminal detection rate varies from place to place or time to time zone as described above, if the actual quantity of people is estimated based on the same quantity of contracted users and rate of spread, in all places, the problem is that the accuracy of the estimation of the quantity of people deteriorates significantly. For example, referring back to the above example of an airport, it may be possible that 60% of the people on the domestic terminal use Wi-Fi, while 90% of the people on the international terminal use Wi-Fi. At this time, if a fixed quantity of Wi-Fi terminals are detected by using Wi-Fi sensors and the actual quantity of people is estimated by setting the terminal detection rates to 60% uniformly, the problem then is that the quantity of people on the international terminal is estimated to be 1.5 times larger than what it actually is.

Furthermore, as described above, Patent Literature 1 discloses a system, which multiplies the quantity of location registration occurrences detected, by the probability distribution values at times before and after the occurrence time zones corresponding to the quantity of occurrences, thereby estimating the distribution of the quantity of people corresponding to the location registrations that occurred during the occurrence time zones. This system can estimate the distribution of the quantity of people who have terminals with them, but cannot estimate the distribution of the actual total quantity of people including those who do not have terminals with them. Consequently, it is difficult to deal with the situation where the terminal detection rate varies from place to place.

Furthermore, as described earlier, Patent Literature 2 discloses a system for comparing the quantity of monitoring targets counted based on image data and the quantity of mobile terminals calculated by a terminal counting unit. Although this system has an advantage of being able to measure the actual quantity of people based on image data, when the terminal detection rate varies from place to place or time to time, it is necessary to install photographing means in all places. When it is not possible to install photographing means in all places, there is a problem that the actual quantity of people in places or time zones with different terminal detection rates cannot be estimated with high accuracy.

Furthermore, for example, the problem with the art disclosed in Patent Literature 3 is that, in the event there is an area in which identified objects cannot be identified and "focused data" is selected during the process of estimating the flow rate of people that move between areas (in S142, for example), the result of estimation changes depending on the order of selection (order of processing), and the performance of estimation may be significantly deteriorated depending on the order of processing (or the quantity of people (the total quantity of moves) does not make sense).

It is therefore an example object of the present invention to provide an object quantity estimation system, an object quantity estimation method, a program, and a recoding medium that can estimate the quantity of objects with high accuracy even if there is an area where the count of the quantity of objects is small.

(2) Technical Features

The present example embodiment, for example, estimates information related to the traveling paths of wireless terminals, counts the quantity of objects that are located in each of the fixed points, calculates a terminal detection rate that indicates a relationship between the quantity of the wireless terminals and the quantity of objects, based on the information related to the traveling paths of the wireless terminals, for each of the fixed points, and determines priorities of the paths, each of which includes at least one of the fixed points, and sequentially estimates the quantity of objects having traveled on the traveling path, in descending order of the priorities of the traveling paths, based on the terminal detection rates.

By this means, for example, it is possible to estimate the quantity of objects with high accuracy even if there is an area where the count of the quantity of objects is small.

Note that the above-described technical feature is one specific example pertaining to an example embodiment of the present invention, and, obviously, example embodiments of the present invention are not limited to the above-described technical feature.

Hereinafter, example embodiments of the present invention will be described in detail with reference to FIGS. 1 to 13. With a first example embodiment, the basic configurations, characteristics, and operations of a terminal path estimation unit, an actual quantity-of-people counting unit, a terminal detection rate calculation unit, and an actual quantity-of-people estimation unit, which implement an actual quantity-of-people estimation method, will be described in detail as an example object quantity estimation system.

In addition, with a second example embodiment, an example case in which a method of prioritizing paths that can be determined uniquely to estimate the quantity of people is used in the actual quantity-of-people estimation unit will be described.

Furthermore, a third example embodiment is a more generalized example embodiment, compared to the first example embodiment and the second example embodiment.

First, both the first example embodiment and the second example embodiment will be described based on examples of quantity-of-people estimation systems that estimate the quantity of people including people who have wireless terminals with them and people who do not. In addition, like the third example embodiment described later, obviously, an object quantity estimation system that estimates the quantity of objects, including objects equipped with wireless terminals and objects not equipped with wireless terminals is also applicable.

2. First Example Embodiment (1) Configuration

FIG. 1 is a diagram to show an overall configuration of a quantity-of-people estimation system 100 according to the first example embodiment. The quantity-of-people estimation system 100 has the following configuration, in order to estimate the locations and paths of terminals in the whole area by detecting wireless terminals' radio waves, count the quantity of people at fixed points in the area based on video analysis using cameras, and estimate the quantity of people in places or paths where there are no cameras by using both of these pieces of information.

That is, the quantity-of-people estimation system 100 includes a terminal path estimation unit 20, an actual quantity-of-people counting unit 30, a terminal detection rate calculation unit 40, and an actual quantity-of-people estimation unit 50. In addition, as a data input means for estimating the traveling paths of terminals and the actual quantity of people in the quantity-of-people estimation system 100, radio wave sensors 200, cameras 300 and so forth may be provided outside.

The terminal path estimation unit 20 estimates information related to the traveling paths of wireless terminals. To be more specific, the terminal path estimation unit 20 receives as input radio wave detection information of terminals from one or more radio wave sensors 200, base stations and so forth, and estimates the quantity, locations and traveling paths of detection-target wireless terminals in the whole target area.

The actual quantity-of-people counting unit 30 counts the actual quantity of people (the quantity of objects) located in each of a number of fixed points. To be more specific, the actual quantity-of-people counting unit 30 counts the actual quantity of people located at each fixed point, based on image analysis or video analysis by using images or videos acquired in the cameras 300.

The terminal detection rate calculation unit 40 calculates, for each of a number of fixed points, a terminal detection rate, which indicates the relationship between the quantity of wireless terminals based on the information related to the traveling paths of wireless terminals and the actual quantity of people (the quantity of objects). That is, the terminal detection rate calculation unit 40 calculate the terminal detection rates at fixed points by using the information of the actual quantity of people at these fixed points, measured by the actual quantity-of-people counting unit 30, and the quantity of terminals at these fixed points, estimated by the terminal path estimation unit 20.

The actual quantity-of-people estimation unit 50 estimates the actual quantity of people in the whole target area by using the information related to the quantity of terminals per traveling path in the whole target area, estimated by the terminal path estimation unit 20, and the terminal detection rate per fixed point photographed by the cameras 300, calculated by the terminal detection rate calculation unit 40. To be more specific, the actual quantity-of-people estimation unit 50 determines the priority of each path that includes one or more fixed points, and, based on the terminal detection rates, sequentially estimates the quantity of objects having traveled on each path, in descending order of the priorities of the paths.

Figure 2:
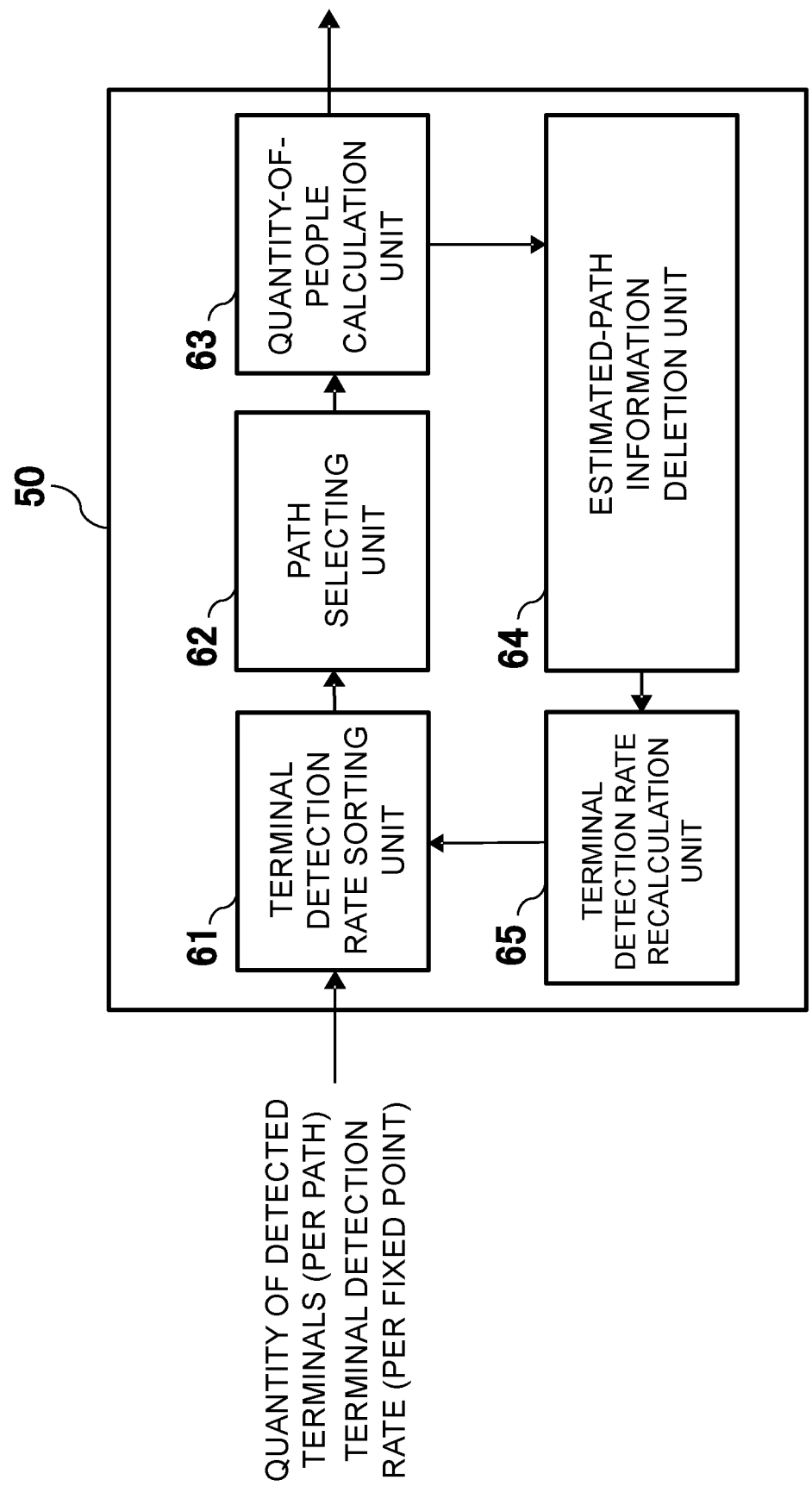
FIG. 2 is a diagram to show an example configuration of an actual quantity-of-people estimation unit 50 according to the first example embodiment.

FIG. 2 is a diagram to show an example configuration of an actual quantity-of-people estimation unit 50 according to the first example embodiment. The actual quantity-of-people estimation unit 50 includes, for example, a terminal detection rate sorting unit 61 that sorts the terminal detection rate of each fixed point, a path selecting unit 62 that selects paths for preferentially estimating the quantity of people based on the terminal detection rates sorted, a quantity-of-people calculation unit 63 that estimates the quantity of people per path, an estimated-path information deletion unit 64 that deletes the information pertaining to paths where the quantity of people has been estimated (the quantity of detected terminals, the actual quantity of people, etc.), from each fixed point in the target area, and a terminal detection rate recalculation unit 65 that recalculates the terminal detection rates based on the updated information of each fixed point, and so forth.

Figure 3:
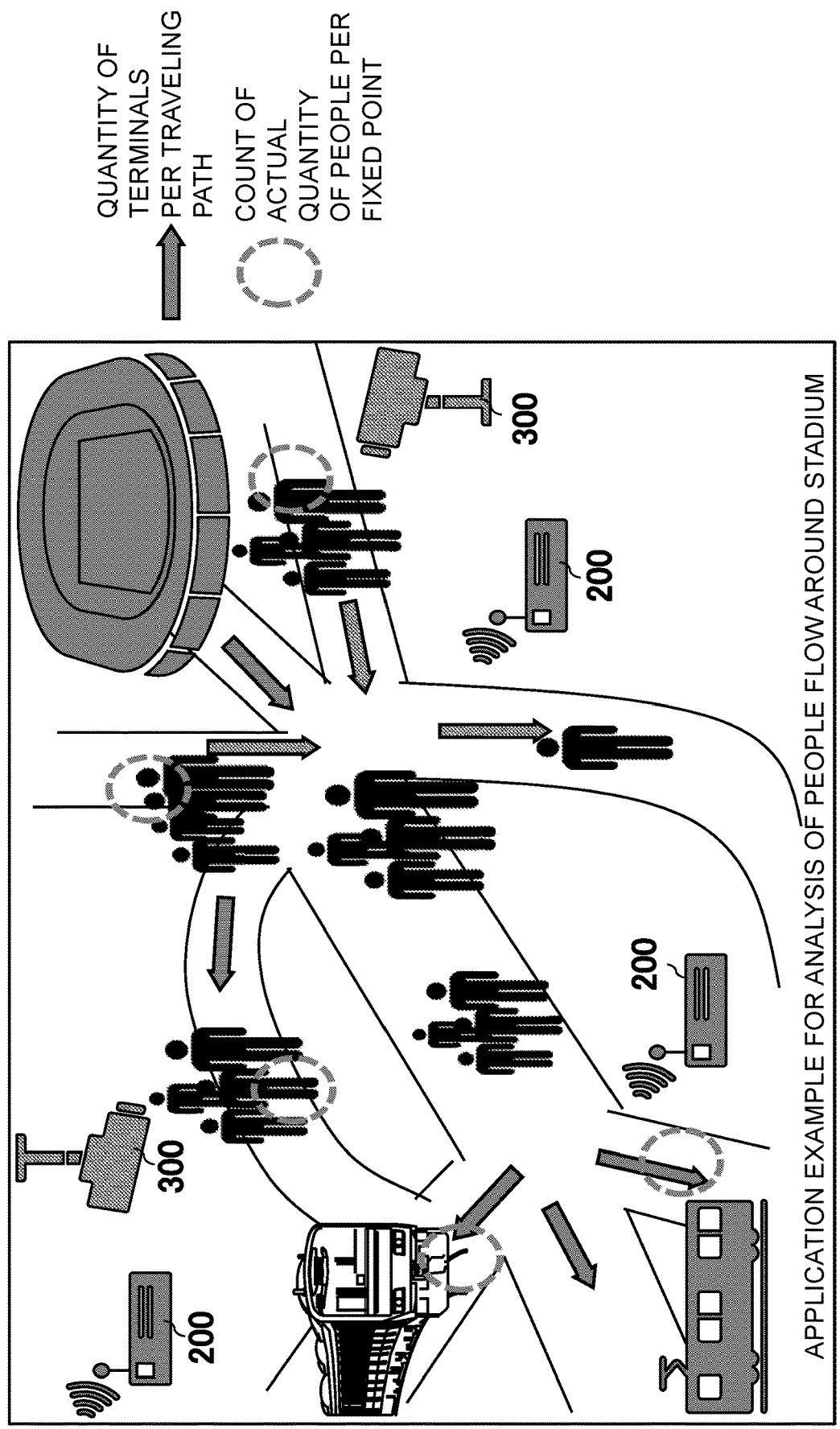
FIG. 3 is a diagram to show an example of the case where the quantity-of-people estimation system 100 according to the first example embodiment is applied to analysis of people flow.

FIG. 3 is a diagram to show an example of the case where the quantity-of-people estimation system 100 according to the first example embodiment is applied to analysis of people flow.

For example, as shown by the solid arrows in FIG. 3, by distributing and placing the radio wave sensors 200 over the whole target area, the terminal path estimation unit 20 can detect the quantity of terminals per traveling path in the target area. Also, as shown by the dotted circles in FIG. 3, the cameras 300 are installed at a number of fixed points in the target area, so that the actual quantity-of-people counting unit 30 can count the actual quantity of people at each fixed point. By this means, the actual quantity-of-people estimation unit 50 can estimate the quantity of people at each point in the whole target area, including fixed points where the cameras 300 are installed, fixed points and traveling paths where no cameras are installed, and so forth.

(2) Operation

Next, the operation of the first example embodiment will be described below.

First, as shown in FIG. 1, the terminal path estimation unit 20 detects the radio wave information of terminals by using one or more radio wave sensors 200, base stations and so forth. For example, wireless schemes to use mobile phone networks such as 2G (GSM (registered trademark), PDC, etc.), 3G (W-CDMA), 4G (LTE, LTE-Advanced, etc.) and 5G, and wireless schemes to use public wireless networks such as wireless LAN (Wi-Fi), Bluetooth (registered trademark), Wi-SUN, Zigbee and LPWA may be examples of the wireless schemes to be detected.

Then, the terminal path estimation unit 20 receives as input the radio wave information detected by each radio wave sensor 200, and estimates the quantity, locations, and traveling paths of detected terminals in the whole target area.

For example, the terminal path estimation unit 20 estimates the location and path of a terminal based on the received signal strength indicator (RSSI) of the terminal's signals received in a number of radio wave sensors 200. Alternatively, the terminal path estimation unit 20 may estimate the location or path of a terminal by using information about the time differences of arrival (TDoA) between received signals or information about the angle of arrival (AoA) in the radio wave sensors 200. Furthermore, a traveling path estimation function may be provided on the terminal side. Furthermore, the radio wave sensor 200 and the terminal path estimation unit 20 may also include base station functions. In this case, this terminal's location information may be acquired by decoding the received signals including the location information.

Through these processes, the terminal path estimation unit 20 can output the quantity of detected terminals that passed a given point in the target area during a given period. Furthermore, terminal traveling path information as to, for example, which given points a given terminal passed during a given time zone can be output.

Next, the cameras 300 installed in the target area per fixed point photograph the flow of people and the flow of objects at each fixed point. The images photographed by the cameras 300 are input to the quantity-of-people estimation system 100 in the form of continuous image data or video data.

Then, using the image data or the video data, the actual quantity-of-people counting unit 30 counts the quantity of people or the quantity of objects in the photographed video data or image data based on a video analysis process such as individual detection, face detection, crowd analysis, and object detection. Here, when cameras are installed at a number of fixed points in the target area, the actual quantity-of-people counting unit 30 counts the actual quantity of people and the quantity of objects per fixed point.

Then, the terminal detection rate calculation unit 40 calculates the terminal detection rates at fixed points by using the information of the actual quantity of people and the quantity of objects at each fixed point, measured by the actual quantity-of-people counting unit 30, and the quantity of terminals at these fixed points, estimated by the terminal path estimation unit 20.

For example, assuming a photographing area p0 of a certain fixed-point camera where the quantity of people counted within time t0 is $C_{\{p0,\ t0\}}$ and the quantity of detected terminals is $M_{\{p0,\ t0\}}$, one method is to use "{the quantity of detected terminals}/{the quantity of people} 100", which is the proportion of detected terminals to the actual quantity of people, that is, "$M_{\{p0,\ t0\}}/C_{\{p0,t0\}} \times 100$", as the terminal detection rate. Also, another method is to use "{the quantity of detected terminals}–{the quantity of people}", which is the quantity of people who do not have terminals with them, represented in negative values, that is, "$M_{\{p0,\ t0\}} - C_{\{p0,\ t0\}}$", as the terminal detection rate. In this case, the stress is more on the quantity of undetected terminals.

Then, the actual quantity-of-people estimation unit 50 estimates the actual quantity of people at various points in the target area.

Figure 4:
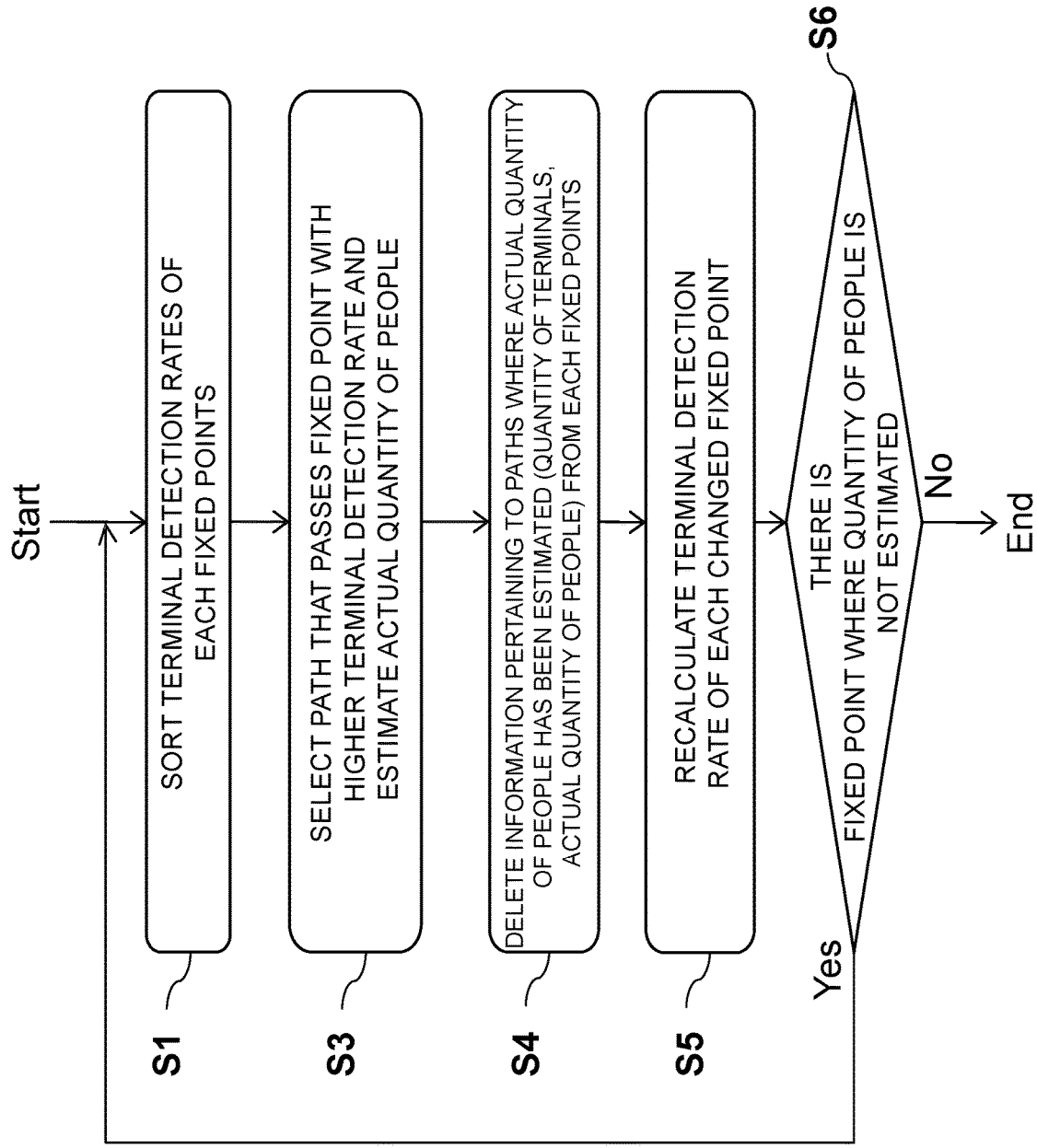
FIG. 4 is a diagram to show an example process flow of the actual quantity-of-people estimation unit 50.

FIG. 4 is a diagram to show an example process flow of the actual quantity-of-people estimation unit 50. The basic operation of the actual quantity-of-people estimation unit 50 will be described below with reference to FIGS. 2 and 4.

In step S1, the terminal detection rate sorting unit 61 sorts the terminal detection rates per fixed point.

In step S3, the path selecting unit 62 selects the traveling path that passes the fixed point of the highest terminal detection rate, based on the terminal detection rates sorted per fixed point. Then, the quantity-of-people calculation unit 63 estimates the actual quantity of people on that path, from the information related to the quantity of detected terminals and the terminal detection rate on that path.

In step S4, when the quantity of people on all paths in the target area is not estimated yet, the estimated-path information deletion unit 64 deletes the information pertaining to paths where the quantity of people is already estimated (information related to the quantity of detected terminals, the actual quantity of people, etc.), from each fixed point in the target area.

In step S5, the terminal detection rate recalculation unit 65 recalculates the terminal detection rate of each fixed point, based on the updated information pertaining to each fixed point (information related to the quantity of detected terminals and the actual quantity of people).

In step S6, if the quantity of people on all paths in the target area is not estimated yet (S6: YES), the actual quantity-of-people estimation unit 50 returns to the process of sorting the terminal detection rate of each fixed point (step S1), based on the recalculated terminal detection rate of each fixed point, and repeats the process. When the quantity of people on all paths is estimated over the repetition of the process (S6: NO), the process of estimating the quantity of people in this time zone is complete.

FIGS. 5 and 6 are diagram to show specific images of processes in the quantity-of-people estimation system 100 (the actual quantity-of-people estimation unit 50). Here, the numerical values with underlines in the drawings indicate the actual quantity of people, the numerical values without underlines indicate the quantity of detected terminals, and the numerical values in parentheses indicate the terminal detection rate.

First, referring to FIG. 5(*a*), the radio waves of terminals are detected by radio wave sensors 200, and, through the path estimation process of the terminal path estimation unit 20, the quantity of terminals detected on each traveling path in the target area in a certain time zone is acquired. For example, FIG. 5 assume a case in which the quantity of terminals detected at a fixed point A is 80, the quantity of terminals detected at a fixed point B is 30, and the quantity of terminals detected at a fixed point C is 10, and in which 80 terminals travel along the path A→D→F. At this time, a case is exemplified where the quantity of terminal on the path D→F is the sum with the quantity of terminals on the path B→D, which is 20, and therefore the total quantity of terminals is 100, and, likewise, the total quantity of terminals detected at a fixed point F is 120.

Also, cameras 300 are installed at the fixed point A and the fixed point F, and the actual quantity of people at each fixed point in the same time zone is counted based on video analysis in the actual quantity-of-people counting unit 30 and/or the like. The example shown in FIG. 5 assumes that 100 people are counted at the fixed point A and 240 people are counted at the fixed point F. In this case, if the terminal detection rate calculation unit 40 calculates the terminal detection rate at each fixed point as a proportion, the fixed point A yields 80/100=80%, and the fixed point F yields 120/240=50%.

Then, the quantity of detected terminals on each path and the terminal detection rate at each fixed point are input, and the actual quantity-of-people estimation unit 50 starts the process of estimating the quantity of people. In FIG. 5(*a*), the terminal detection rate sorting unit 61 sorts the terminal detection rate of each fixed point (step S1). In this example, the terminal detection rate of 80% at the fixed point A is greater than the terminal detection rate of 50% at the fixed point F, and therefore has higher priority.

Next, referring to FIG. 5(*b*), the actual quantity-of-people estimation unit 50 performs the process of estimating the quantity of people, sequentially, in order of priority. Here, A is the fixed point having the highest priority among the terminal detection rates sorted. Consequently, the path selecting unit 62 selects the path A→D→F, which passes the fixed point A, and the quantity-of-people calculation unit 63 estimates the actual quantity of people on this path (step S3). In this example, given that the terminal detection rate at the fixed point A is 80%, the calculation gives that the quantity of terminals at the fixed point A is 80 terminals and that 100 people have traveled on the path A→D→F, and the actual quantity of people on the path A→D→F is 100 people.

Next, referring to FIG. 5(*c*), the estimated-path information deletion unit 64 deletes the information of the path A→D→F, where the quantity of people has been estimated (step S4). To be more specific, the information related to the quantity of terminals detected on the path A→D→F, which is 80 terminals, and the actual quantity of people, which is 100 people, is deleted, so that the quantity of terminals detected on the path D→F is 20 terminals, and, at the fixed point F, the quantity of detected terminals is 40 terminals, and the actual quantity of people is 140 people. Then, based on the updated information of each fixed point, the terminal detection rate recalculation unit 65 recalculates the terminal detection rate of each fixed point that is not included in the estimated path (step S5). In this example, the terminal detection rate at fixed point F is updated to 40/140=28.6%.

Here, the actual quantity of people at all fixed points and paths is not estimated yet, and so the process is repeated. That is, referring to FIG. 6(*a*), the information of each fixed point's updated terminal detection rate is re-sorted (step S1). In this example, F is the only remaining fixed point, and the terminal detection rate is 28.6%.

Then, referring to FIG. 6(*b*), the actual quantity of people is calculated for all of the paths B→D→F, B→E→F, and C→E→F, which pass the remaining fixed point F (step S3). In this example, given that the terminal detection rate at the fixed point F is 28.6%, the calculation gives that 20 terminals have traveled and 70 people have traveled on the path B→D→F. In addition, the calculation gives that 10 terminals have traveled and 35 people have traveled on the path B→E→F. In addition, the calculation gives that 10 terminals have traveled and 35 people have traveled on the path C→E→F. Also, the actual quantity of people is estimated to be 105 people at a fixed point B, and the actual quantity of people is estimated to be 35 people at a fixed point C. As described above, the actual quantity of people at all fixed points and paths is estimated, so that the process of estimating the quantity of people in this time zone is completed.

In this way, according to the first example embodiment, even in cases in which the terminal detection rate varies from place to place or time to time, the actual quantity of people in the target area can be estimated sequentially by combining information related to the quantity of detected terminals per traveling path, which is detected by using radio wave sensors, and information about the actual quantity of people per fixed point, which is counted by using cameras. That is, it is possible to estimate the actual quantity of people with high accuracy, including places in the target area where there are no cameras.

Now, what advantage is brought about when the actual quantity-of-people estimation unit 50 sequentially and preferentially estimates the actual quantity of people from paths that pass fixed points where the terminal detection rate is high will be described below.

This is because, by preferentially using information pertaining to fixed points of high terminal detection rates, information of high reliability (that is, information in which the proportion of people who are counted in the actual quantity of people, but whose terminals are undetected and whose traveling paths are therefore uncertain is small compared to the actual quantity of people) is used preferentially. This is because the reliability of the estimation of the quantity of people is relatively high.

For example, at the fixed point A shown in FIG. 5, the terminal detection rate is 80%, and only 20% of the people, namely 20 people, are uncertain. On the other hand, at the fixed point F, the terminal detection rate is 50%, and 50% of the people, namely 120 people, are uncertain. In this case, the information pertaining to the fixed point A, if used preferentially, provides an advantage of gaining information of higher reliability. Also, paths to pass fixed points with high terminal detection rates, if subjected to estimation preferentially, provides an advantage of preventing producing irregularities, such as estimated values that exceed actual measured values (count values), during the process of estimating the quantity of people per point.

Figure 7B:
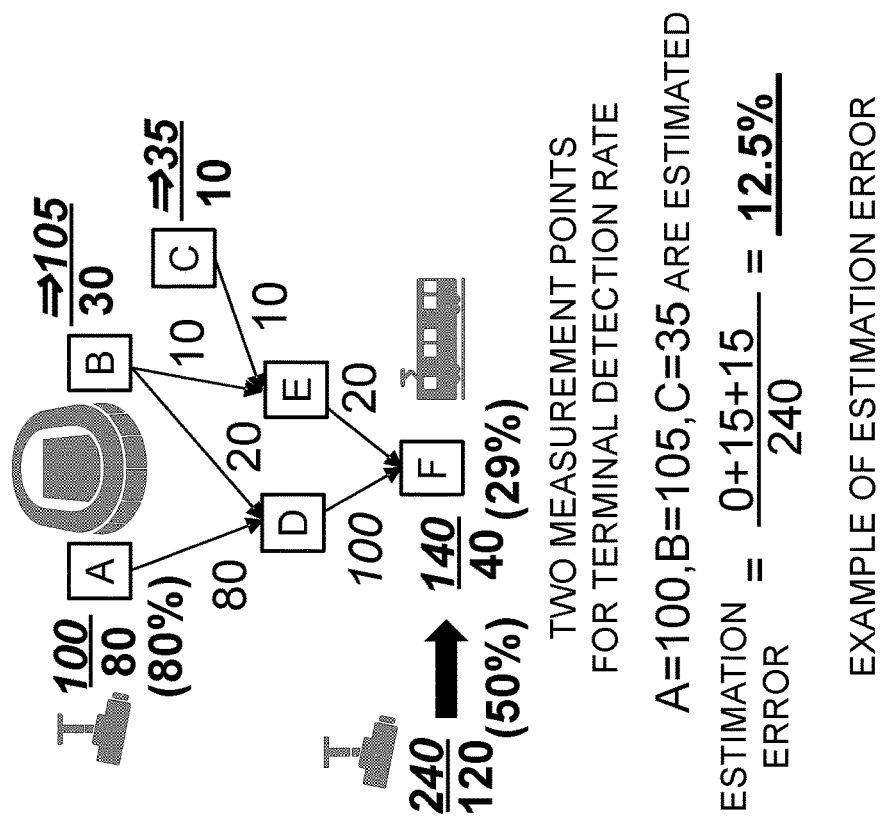
FIG. 7B is a diagram to show examples of correct values and an example of estimation error in the examples of processing images shown in FIGS. 5 and 6.
Figure 7A:
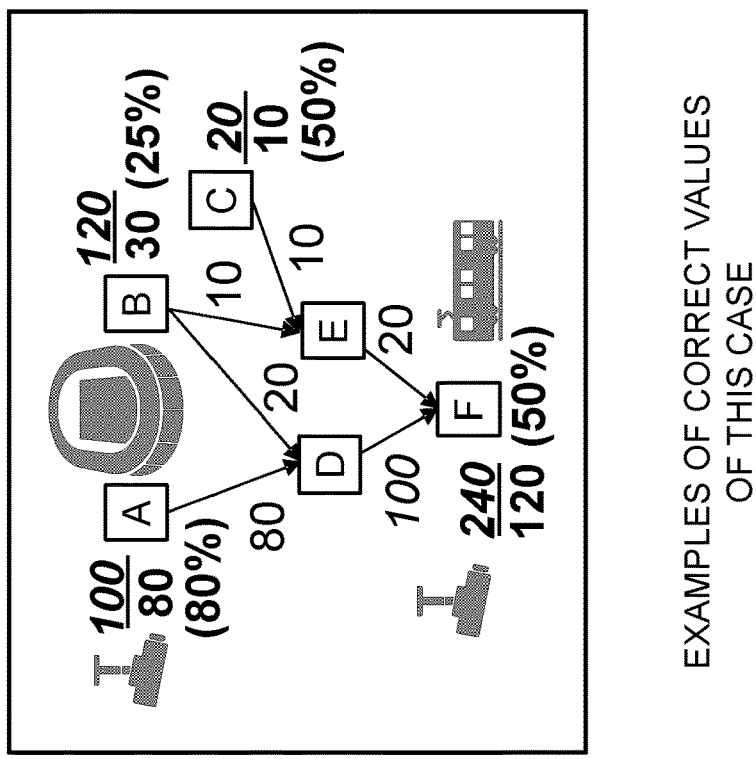
FIG. 7A is a diagram to show examples of correct values and an example of estimation error in the examples of processing images shown in FIGS. 5 and 6.

FIGS. 7A and 7B are diagrams to show examples of correct values and an example of estimation error in the examples of processing images shown in FIGS. 5 and 6. As shown in FIG. 7A, the overall terminal detection rate (terminal owning rate) is actually 50%, and the terminal detection rate at the fixed point F and the fixed point C is 50%. On the other hand, assume an example in which the fixed point A, which is an entrance/exit gate on the home side, shows a high terminal detection rate of 80%, and in which, by contrast with this, the fixed point B, which is an entrance/exit gate on the away side, shows a low terminal detection rate of 25%. At this time, in the examples shown in FIGS. 5 and 6, the actual quantity of people is counted by using cameras not only at the fixed point F but also at the fixed point A, thereby improving the accuracy of the estimation of the actual quantity of people. As shown in FIG. 7B, the fixed point A=100 people, the fixed point B=105 people, the fixed point C=35 people were estimated as a result. Compared to the correct values that is, the fixed point A=100 people, the fixed point B=120 people and the fixed point C=20 people, the estimation error at these three fixed points can be calculated as (0+15+15)/240 =12.5%.

In addition, the first example embodiment is not limited to the estimation method described above, and various changes are possible. For example, in another method of estimating the quantity of people, only the terminal detection rate at the fixed point F, which is also the overall terminal detection rate (terminal owning rate) 120 terminals/240 people=50%, may be used to estimate the quantity of people at all fixed points and on all paths.

This corresponds to the case in which the camera is installed only at the fixed point F to count the actual quantity of people. In this case, given that the actual quantity of people at each point is estimated to be the fixed point A=80/0.5=160 people, the fixed point B=30/0.5=60 people, and the fixed point C=10/0.5=20 people, the quantity of people estimation error at these three fixed points can be calculated as (60+60+0)/240=50%.

In addition, in another method of estimating the quantity of people, the actual quantity of people at the fixed point B or the fixed point C without cameras may be estimated by using the average value of the terminal detection rates of the fixed point A and the fixed point F, which are fixed points where no cameras installed. In this case, the terminal detection rate of 80% at the fixed point A and the terminal detection rate of 50% at the fixed point F give an average terminal detection rate of (80+50)/2=65%, and, by using this, the actual quantity of people at each point is estimated to be the fixed point B=30/0.65=46 people and the fixed point C=15 people, so that the estimation error at three points including the fixed point A can be calculated as (0+74+5)/240=33%. Alternatively, the actual quantity of people at each point is estimated, based on an average terminal detection rate value of (80+120)/(100+240)=58.8%, to be the fixed point B=30/0.588=51 people and the fixed point C=10/0.588=17 people. The estimation error at the three points in this case can be calculated as (0+69+3)/240=30%.

3. Second Example Embodiment (1) Configuration

FIG. 8 is a diagram to show an overall configuration of a quantity-of-people estimation system 101 according to the second example embodiment. When the quantity-of-people estimation system 101 according to the second example embodiment estimates the actual quantity of people, the quantity of people is estimated by prioritizing paths where the quantity of people can be determined uniquely. Furthermore, the quantity-of-people estimation system 101 according to the second example embodiment inputs the count value of the actual quantity of people at each fixed point, in addition to the quantity of terminals detected on each path and the rate of terminals detected at each fixed point, to the actual quantity-of-people estimation unit 51.

To be more specific, the quantity-of-people estimation system 101 includes a terminal path estimation unit 20, an actual quantity-of-people counting unit 30, a terminal detection rate calculation unit 41, and an actual quantity-of-people estimation unit 51. In addition, similar to the first example embodiment, as a data input means for estimating the traveling paths of terminals and the actual quantity of people in the quantity-of-people estimation system 101, radio wave sensors 200, cameras 300 and so forth may be provided outside.

Here, as a configuration unique to the second example embodiment, an example is shown in which, in addition to the quantity of detected terminals on each path estimated by the terminal path estimation unit 20 and the terminal detection rate at each fixed point calculated by the terminal detection rate calculation unit 41, the count value of the actual quantity of people at each fixed point counted by the quantity-of-people counting unit 30 is also input as input to the actual quantity-of-people estimation unit 51.

Note that, in the event such a configuration is employed, the terminal detection rate calculation unit 41 may be provided inside the actual quantity-of-people estimation unit 51.

Furthermore, the terminal detection rate calculation unit 41 according to the second example embodiment calculates the following value as the terminal detection rate, instead of using a simple proportion or ratio related to the count value of the actual quantity of people and the quantity of detected terminals. That is, the terminal detection rate calculation unit 41 calculates the quantity of people whose terminals are undetected (the quantity of people whose traveling paths are uncertain), which is the difference after the quantity of terminals detected is subtracted from the count value of the actual quantity of people, and which is represented as a negative value, as the terminal detection rate.

Figure 9:
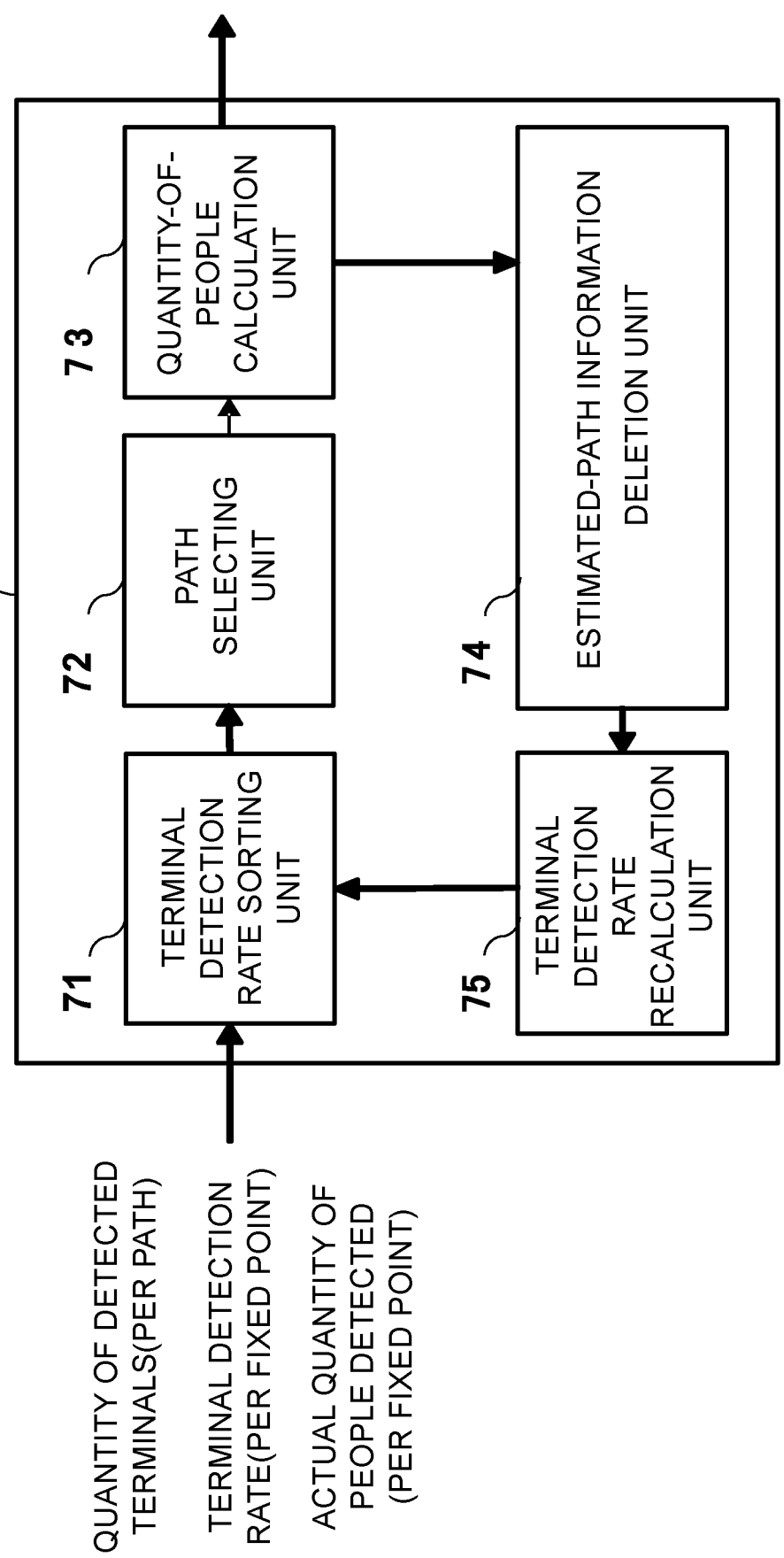
FIG. 9 is a diagram to show a configuration of an actual quantity-of-people estimation unit 51 according to the second example embodiment.

FIG. 9 is a diagram to show a configuration of an actual quantity-of-people estimation unit 51 according to the second example embodiment. As shown in FIG. 9, the actual quantity-of-people estimation unit 51 includes, for example, a terminal detection rate sorting unit 71 that sorts the terminal detection rate of each fixed point, a path selecting unit 72 that selects paths for preferentially estimating the quantity of people based on the terminal detection rates sorted, a quantity-of-people calculation unit 73 that estimates the quantity of people per path, an estimated-path information deletion unit 74 that deletes the information pertaining to paths where the quantity of people has been estimated (the quantity of detected terminals, the actual quantity of people, etc.), from each fixed point in the target area, a terminal detection rate recalculation unit 75 that recalculates the terminal detection rates based on the updated information of each fixed point, and so forth.

Here, as a configuration that is unique to the second example embodiment, when a path for preferentially estimating the quantity of people is selected, the path selecting unit 72 selects the path by using not only information as to whether or not the quantity of people can be estimated uniquely on that path, but also by using the terminal detection rate-related information described that has been with the first example embodiment. Furthermore, when the terminal detection rate calculation unit 41 is configured to be provided inside the actual quantity-of-people estimation unit 51, the terminal detection rate recalculation unit 75 may be configured to also have the function of the terminal detection rate calculation unit 41. Alternatively, the terminal detection rate calculation unit 41 may be configured to also have the function of the terminal detection rate recalculation unit 75.

(2) Operation

Next, the operation of the second example embodiment will be described below.

First, as shown in FIG. 8, the radio wave information of terminals is detected by using one or more radio wave sensors 200 or base stations. Then, the terminal path estimation unit 20 receives as input the radio wave information detected by each radio wave sensor 200, and estimates the quantity, locations, and traveling paths of detected terminals in the whole target area.

Furthermore, the cameras 300 installed in the target area per fixed point photograph the flow of people and the flow of objects at each fixed point. Then, based on the image data or video data input from the cameras 300, the actual quantity-of-people counting unit 30 counts the quantity of people or the quantity of objects in the photographed video data or image data, based on a video analysis process such as individual detection, face detection, crowd analysis, object detection and so forth. Here, the actual quantity-of-people counting unit 30 counts the actual quantity of people and the quantity of objects, per fixed point where cameras are installed.

Then, the terminal detection rate calculation unit 41 calculate the terminal detection rates at fixed points by using the information of the actual quantity of people at these fixed points, measured by the actual quantity-of-people counting unit 30, and the quantity of terminals at these fixed points, estimated by the terminal path estimation unit 20. The first example embodiment, for example, one method is to use "{the quantity of detected terminals}/{the quantity of people (or the quantity of things)}×100", which is the proportion of detected terminals to the actual quantity of people, that is, "$M_{\{p0,\ r0\}}/C_{\{p0,\ r0\}} \times 100$", as the terminal detection rate. Here, the second example embodiment, as another method to use "{the quantity of detected terminals}−{the quantity of people (or the quantity of things)}", which is a negative value to represent the quantity of people who do not have terminals with them, that is, indicate the quantity of people whose terminals are undetected (the quantity of people whose traveling paths are uncertain), shall be calculated as the terminal detection rate.

Then, the actual quantity-of-people estimation unit 51 estimates the actual quantity of people at various points in the target area.

Figure 10:
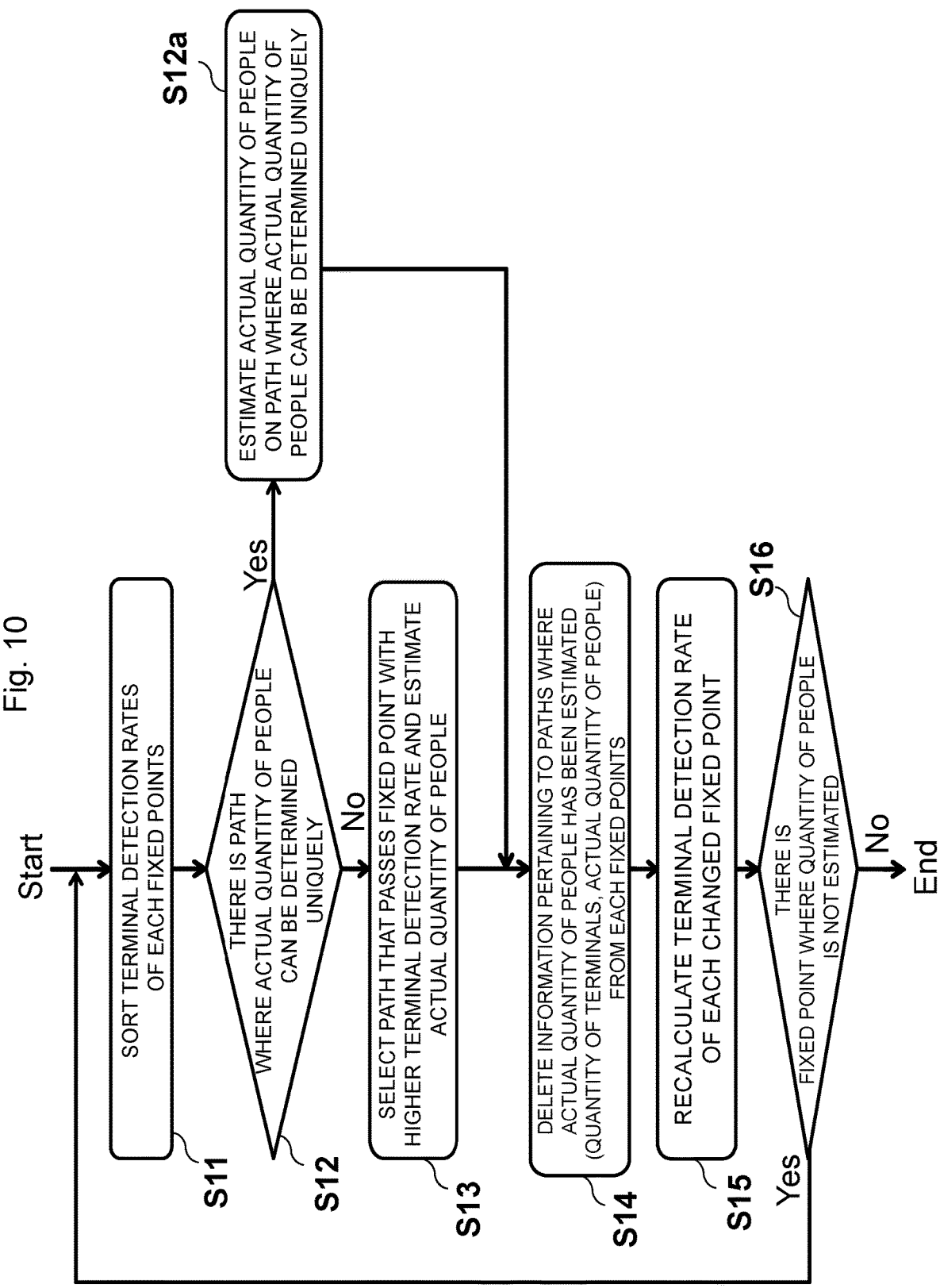
FIG. 10 is a diagram to show an example process flow of the actual quantity-of-people estimation unit 51.

FIG. 10 is a diagram to show an example process flow of the actual quantity-of-people estimation unit 51. The basic operation of the actual quantity-of-people estimation unit 51 will be described below with reference to FIGS. 9 and 10.

In step S11, the terminal detection rate sorting unit 71 sorts the terminal detection rates per fixed point.

In step S12, the path selecting unit 72 selects traveling paths for preferentially estimating the actual quantity of people. Here, the operation unique to the second example embodiment is that, if there is a path where the actual quantity of people can be determined uniquely (S2: YES), the step proceeds to step S12a. Then, the quantity-of-people calculation unit 73 prioritizes that path, and estimates the actual quantity of people on that selected path from the information related to the quantity of detected terminals and the terminal detection rate on that path. Then, the step proceeds to step S14.

On the other hand, if there are no paths where the actual quantity of people can be determined uniquely (S12: NO), the step proceeds to step S13, and, similar to the first example embodiment, the quantity-of-people calculation unit 73 uses each fixed point's terminal detection rate that has been sorted, and do the estimate, preferentially, from the path that passes the fixed point with the highest terminal detection rate. That is, the quantity-of-people calculation unit 73 estimates the actual quantity of people on the selected path from the information related to the quantity of detected terminals and the terminal detection rate on that path. Then, the step proceeds to step S14.

In step S14, when the quantity of people on all paths in the target area is not estimated yet, the estimated-path information deletion unit 74 deletes the information pertaining to paths where the quantity of people is already estimated (information related to the quantity of detected terminals, the actual quantity of people, etc.), from each fixed point in the target area.

In step S15, the terminal detection rate recalculation unit 75 recalculates the terminal detection rate of each fixed point, based on the updated information pertaining to each fixed point (information related to the quantity of detected terminals and the actual quantity of people).

In step S16, if the quantity of people on all paths in the target area is not estimated yet (S16: YES), the actual quantity-of-people estimation unit 51 returns to the process of sorting the terminal detection rate of each fixed point (step S11), based on the recalculated terminal detection rate of each fixed point, and repeats the process. When the quantity of people on all paths is estimated over the repetition of the process (S16: NO), the process of estimating the quantity of people in this time zone is complete.

Figure 12:
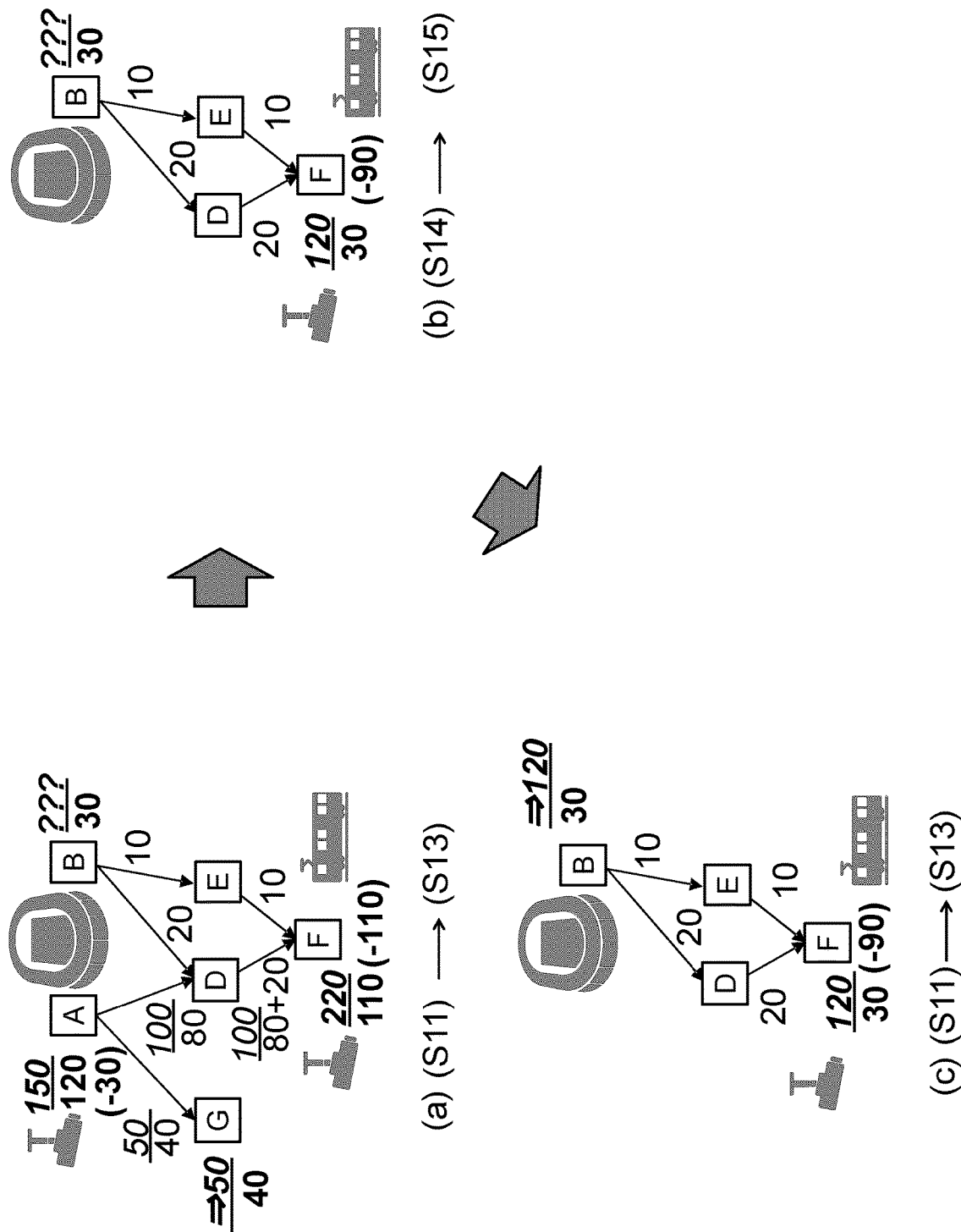
FIG. 12 is a diagram to show a specific image of processes in the quantity-of-people estimation system 101 (the actual quantity-of-people estimation unit 51)

FIGS. 11 and 12 are diagram to show specific images of processes in the quantity-of-people estimation system 101 (the actual quantity-of-people estimation unit 51). Here, the numerical values with underlines in the drawings indicate the actual quantity of people, the numerical values without underlines indicate the quantity of detected terminals, and the numerical values in parentheses indicate the terminal detection rate.

Note that, referring to the examples shown in FIGS. 11 and 12, differences from the examples of FIGS. 5 and 6, which have been shown as examples of the first example embodiment, primarily include that path A→G is introduced as an additional path, and that a fixed point C is introduced as a fixed observation point by the camera. Moreover, the quantity of people counted, the quantity of detected terminals and so forth at each fixed point and path are also different from the examples of the first example embodiment.

First, referring to FIG. 11(a), the radio waves of terminals are detected by radio wave sensors 200, and, the quantity of detected terminals on each traveling path in the target area in a certain time zone is acquired by the terminal path estimation unit 20. For example, FIG. 11 assumes a case in which 120 terminals are detected at a fixed point A, 30 terminals are detected at fixed point B, 40 terminals are detected at the fixed point C, and in which 80 terminals travel on the path A→D→F and 40 terminals travel on the path A→G. It is also assumed that 40 terminals travel along the path C→E→F. At this time, the quantity of terminal on the path D→F is the sum with the quantity of terminals on the path B→D, which is 20, and therefore the total quantity of terminals is 100. Furthermore, this is an example case in which a total of 150 terminals are similarly detected at a fixed point F.

Also, cameras 300 are installed at the fixed point A, the fixed point C and the fixed point F, and the actual quantity of people at each fixed point in the same time zone is counted based on video analysis in the actual quantity-of-people counting unit 30. The example shown in FIG. 11 assumes that 150 people are counted at the fixed point A, 80 people are counted at the fixed point C, and 300 people are counted at the fixed point F. In this case, if the terminal detection rate calculation unit 41 calculates the terminal detection rate at each fixed point based on {the quantity of detected terminals—the actual quantity of people counted}, 120−150="−30 people" (proportion: 80%) is calculated for the fixed point A, 40−80="−40 people" (50%) is calculated for the fixed point C, and 150−300="−150 people" (50%) is calculated for the fixed point F.

Then, the quantity of detected terminals on each path and the terminal detection rate at each fixed point are input, and the actual quantity-of-people estimation unit 51 starts the process of estimating the quantity of people. In FIG. 11(a), the terminal detection rate sorting unit 71 sorts the terminal detection rate of each fixed point (step S11). In this example, the terminal detection rate at the fixed point A is −30 people, the terminal detection rate at fixed point C is −40 people, and the terminal detection rate at the fixed point F is −150 people, in descending order of priority.

Next, referring to FIG. 11(b), the actual quantity-of-people estimation unit 51 performs the process of estimating the quantity of people, sequentially, in order of priority. First, the path selecting unit 72 according to the second example embodiment determines whether or not there are paths where the actual quantity of people can be determined uniquely (step S12). Among the paths A→D→F, A→G, B→D→F, B→E→F and C→E→F, the path C→E→F is a path where the quantity of people can be determined uniquely, and so this path is selected. Then, the quantity-of-people calculation unit 73 calculates the quantity of terminals that have traveled on the path and the actual quantity of people as 40 terminals and 80 people, respectively.

Next, referring to FIG. 11(c), the estimated-path information deletion unit 74 deletes the information of the path C→E→F, where the quantity of people has been estimated (step S14). The information of the quantity of terminals detected on the path C→E→F, which is 40 terminals, and the actual quantity of people, which is 80 people, is deleted, so that the quantity of terminals detected on the path E→F is 10 terminals, and, at the fixed point F, the quantity of detected terminals is 110 terminals and the actual quantity of people is 220 people. Then, the terminal detection rate recalculation unit 75 recalculates the terminal detection rate of each fixed point based on the updated information of each fixed point (step S15). In this example, the terminal detection rate at the fixed point F is updated to 110−220="−110 people" (50%).

Here, the actual quantity of people at all fixed points and paths is not yet estimated, and so the process is repeated. That is, referring to FIG. 12(a), the information of each fixed point's updated terminal detection rate is re-sorted (step S11). In this example, the fixed point A and the fixed point F are the remaining fixed points, and the terminal detection rate at the fixed point A is −30 people and the terminal detection rate at the fixed point F is −110 people, in descending order of priority. Then, the path selecting unit 72 determines whether or not there are paths where the actual quantity of people can be determined uniquely (step S12). Referring to the example shown in FIG. 12(a), there are no paths where the actual quantity of people can be determined uniquely. Consequently, the path A→D→F and the path A→G, which pass the fixed point A having the highest priority, are selected in accordance with the sorted terminal detection rates. Then, the quantity-of-people calculation unit 73 estimates the actual quantity of people on these paths (step S13). In this example, given that the terminal detection rate at the fixed point A is −30 people (80%), the quantity of terminals having traveled on the path A→D→F and the actual quantity of people are calculated as 80 terminals and 100 people, respectively, and the quantity of terminals having traveled on the path A→G and the actual quantity of people are calculated as 40 terminals and 50 people, respectively.

Then, in FIG. 12(b), the estimated-path information deletion unit 74 deletes the information of the paths A→D→F and A→G, where the quantity of people has been estimated (step S14). To be more specific, the information related to the quantity of terminals detected on the path A→D→F, which is 80 terminals, and the actual quantity of people, which is 100 people, is deleted, so that the quantity of terminals detected on the path D→F is 20 terminals, and, at the fixed point F, the quantity of detected terminals is 30 terminals, and the actual quantity of people is 120 people. Then, based on the updated information of each fixed point, the terminal detection rate recalculation unit 75 recalculates the terminal detection rate of each fixed point that is not included in the estimated paths (step S15). In this example, the terminal detection rate at the fixed point F is updated to 30−120="−90 people" (25%).

Here, the actual quantity of people at all fixed points and paths is not yet estimated, and so the process is repeated. That is, referring to FIG. 12(c), the information of each fixed point's updated terminal detection rate is re-sorted (step S11). In this example, F is the only remaining fixed point, and the terminal detection rate is −90%. Then, the actual quantity of people is calculated for all of the paths B→D→F and B→E→F, which pass the remaining fixed point F (step S13). In this example, given that the terminal detection rate at the fixed point F is "−90" (25%), the calculation gives that 80 people with 20 terminals have traveled on the path B→D→F. Furthermore, the calculation gives that 40 people with 10 terminals have traveled on the path B→E→F. Also, the actual quantity of people at a fixed point B is estimated to be 120 people. As described above, the actual quantity of people at all fixed points and paths is estimated, so that the process of estimating the quantity of people in this time zone is completed.

In this way, according to the second example embodiment, same as the first example embodiment, even in cases in which the terminal detection rate varies from place to place or time to time, the actual quantity of people in the target area can be estimated sequentially by combining information related to the quantity of detected terminals per traveling path, which is detected by using radio wave sensors, and information about the actual quantity of people per fixed point, which is counted by using cameras. That is, it is possible to estimate the actual quantity of people with high accuracy, including places in the target area where there are no cameras.

Here, the advantages of using the method of calculating terminal detection rates, which is a process that is unique to the second example embodiment, will be described below. That is, the advantage of using "{the quantity of detected terminals}-{the quantity of people}", which is a negative value to represent the quantity of people who do not have terminals with them as the terminal detection rate, instead of using "{the quantity of detected terminals}/{the quantity of people}×100", which is the proportion of detected terminals to the actual quantity of people, will be described below.

First, the terminal detection rate is the quantity of undetected terminals, so that the actual quantity of people with uncertain traveling paths is represented by a negative value, and, if there are many such "uncertain" people, the negative value will have a greater absolute value, and the value will be smaller than when there are fewer such "uncertain" people. Then, in the actual quantity-of-people estimation unit 51, the actual quantity of people is estimated sequentially, by preferentially using the information pertaining to fixed points with higher terminal detection rates, so that information of high reliability (that is, information in which the absolute quantity of people who are counted in the actual quantity of people, but who are not detected to have terminals with them and whose traveling paths are therefore uncertain is small) is used preferentially. By this means, the reliability of the estimation of the quantity of people becomes relatively high.

For example, the terminal detection rate at the fixed point A shown in FIG. 11 is "−30 people", whereas the terminal detection rate at the fixed point F is "−150 people". In this case, the information pertaining to the fixed point A, if used preferentially, provides an advantage of making the quantity of uncertain elements smaller, and improving the likelihood of gaining estimation results of higher reliability. Also, paths to pass fixed points with high terminal detection rates, if subjected to estimation preferentially, also provides an advantage of preventing producing irregularities, such as estimated values that exceed actual measured values (count values), during the process of estimating the quantity of people per point.

Furthermore, the advantage of the process unique to the second example embodiment—that is, what advantage is brought about from estimating the actual quantity of people preferentially from paths where the actual quantity-of-people estimation unit 51 can uniquely determine the actual quantity of people (step S12)—will be described below.

First, the actual quantity of people is estimated preferentially from paths where the actual quantity of people can be determined uniquely, so that information with fewer uncertain elements and hence higher reliability (information that can uniquely determine the combination of the quantity of terminals that have traveled through certain paths and the actual quantity of people by narrowing down traveling paths) can be used preferentially. As a result of this, the actual quantity of people is estimated, in order, from information of higher reliability, and the range of estimation is narrowed when doing the estimate by using information of lower reliability. Consequently, there is an advantage of improving the likelihood of gaining more reliable results of estimating the quantity of people.

Note that the example shown in FIG. 10 includes, following the process of sorting the terminal detection rate of each fixed point (step S11), a flow of performing the process of determining if there are paths where the actual quantity of people can be determined uniquely (step S12), but the order of these two processes is not inter-dependent. Consequently, a process flow may be used here in which, after whether there are paths where the actual quantity of people can be determined uniquely is determined and the actual quantity-of-people calculation process (step S12) is performed, if there are no paths where the actual quantity of people can be determined uniquely, the terminal detection rate of each fixed point is sorted (S11). In particular, by switching to such a process flow, the process of sorting the terminal detection rate of each fixed point can be skipped when there are paths where the actual quantity of people can be determined uniquely, and therefore there is an advantage of expecting acceleration.

4. Third Example Embodiment

Next, the third example embodiment of the present invention will be described below with reference to FIG. 13. Although the first and second example embodiments described above are specific example embodiments, the third example embodiment is a more generalized example embodiment.

Figure 13:
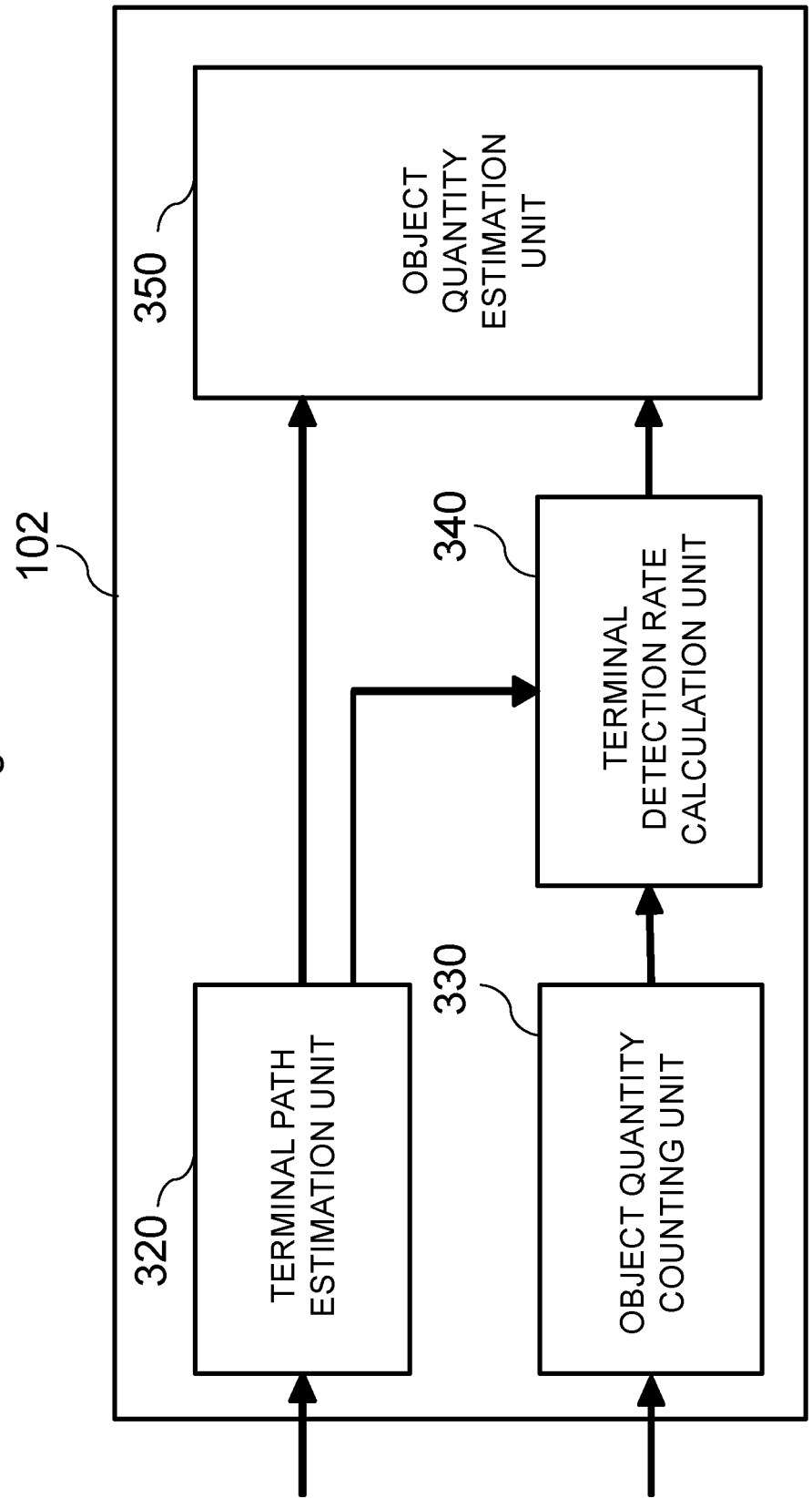
FIG. 13 is a block diagram to show an example of a schematic configuration of an object quantity estimation system 102 according to a third example embodiment.

Referring to FIG. 13, an example of the configuration of an object quantity estimation system 102 according to the third example embodiment will be described. FIG. 13 is a block diagram to show an example of a schematic configuration of the object quantity estimation system 102 according to the third example embodiment. Referring to FIG. 13, the object quantity estimation system 102 includes a terminal path estimation unit 320, an object quantity counting unit 330, a terminal detection rate calculation unit 340, and an object quantity estimation unit 350.

According to the object quantity estimation system 102 having the above configuration, the terminal path estimation unit 320 estimates information related to the traveling paths of wireless terminals. The object quantity counting unit 330 counts the quantity of objects located in each of a number of fixed points. The terminal detection rate calculation unit 340 calculates a terminal detection rate for each of the fixed points, which indicates the relationship between the quantity of wireless terminals and the quantity of objects, based on the information related to the traveling paths of the wireless terminals. The object quantity estimation unit 350 determines the priority of each path that includes one or more fixed points among the fixed points, and, based on the terminal detection rates, sequentially estimates the quantity of objects having traveled on each path, in descending order of the priorities of the paths.

For example, the terminal path estimation unit 320 may perform the operation of the terminal path estimation unit 20 according to the first example embodiment or the second example embodiment described above. In addition, the object quantity counting unit 330 may perform the operation of the actual quantity-of-people counting unit according to the first example embodiment or the second example embodiment described above. Furthermore, the terminal detection rate calculation unit 340 may perform the operation of the terminal detection rate calculation unit 40 according to the first example embodiment or the terminal detection rate calculation unit 41 according to the second example embodiment described above.

Furthermore, the object quantity estimation unit 350 may perform the operation of the actual quantity-of-people estimation unit 50 according to the first example embodiment or the actual quantity-of-people estimation unit 51 according to the second example embodiment described above.

5. Advantageous Effects of Example Embodiments

According to the example embodiment as described above, the following advantageous effects may be expected.

The first advantageous effect is that the actual quantity of people can be estimated in each place and time even in cases in which the terminal detection rate varies from place to place or time to time. The reason for this is that the actual quantity of people can be estimated even in places in the target area where there are no cameras, by sequentially estimating the actual quantity of people in each place (fixed point or path) in the target area by using both information related to the quantity of terminals detected on each traveling path using radio wave sensors and information about the actual quantity of people counted at each fixed point using cameras.

Here, the above-described example embodiments are first characterized in that the actual quantity of people counted per fixed point by using cameras and information related to the traveling paths of terminals detected based on radio wave detection are combined. It is possible to count the actual quantity of people at fixed points based on video analysis using cameras installed per fixed point and so forth. Moreover, information about traveling paths, stay times and so forth that meet certain proportions (terminal detection rates) can be acquired, though not for all, by detecting the radio waves of terminals and estimating their traveling paths by using radio wave sensors. Then, combining these pieces of information has the advantage of being able to estimate the actual quantity of people at each fixed point or path in the target area even when people do not have terminals with them, and even in places where there are no cameras.

The second advantageous effect is that the actual quantity of people can be estimated with "high accuracy" in each place and time even in cases in which the terminal detection rate varies from place to place or time to time. The reason for this is that, as described earlier as a feature of example embodiments, when the quantity-of-people estimation unit estimates the actual quantity of people, the quantity-of-people estimation unit does the estimate, sequentially, preferentially from paths that pass fixed points where the terminal detection rate is high. That is, information pertaining to fixed points with high terminal detection rates (that is, the proportion of the quantity of detected terminals to the actual quantity of people counted is high) may be used preferentially, so that information of high reliability (that is, information in which the proportion of people who are counted in the actual quantity of people, but whose terminals are undetected and whose traveling paths are therefore uncertain is small compared to the actual quantity of people) is used preferentially, which brings about the advantage of making the accuracy of estimating the quantity of people relatively high.

Note that, as described earlier with the second example embodiment, even when the difference between the actual quantity of people counted and the quantity of detected terminals is used as the terminal detection rate, information of high reliability (that is, information in which the absolute quantity of people who are counted in the actual quantity of people, but whose terminals are undetected and whose traveling paths are therefore uncertain is small) is used preferentially, which brings about the advantage of making the accuracy of estimating the quantity of people relatively high.

Also, as described earlier with the second example embodiment, when the actual quantity-of-people estimation unit estimates the actual quantity of people, the actual quantity of people is estimated preferentially from paths where the actual quantity of people can be determined uniquely, so that information with fewer uncertain elements and hence higher reliability (information that can narrow down the traveling paths and that can uniquely determine the combination of the quantity of terminals that have traveled through certain paths and the actual quantity of people) can be used preferentially. As a result of this, the actual quantity of people is estimated, in order, from information of higher reliability, and the range of estimation is narrowed when doing the estimate by using information of lower reliability, so that there is an advantage of improving the likelihood of gaining more reliable results of estimating the quantity of people.

The third advantageous effect is that contradictions in which, for example, estimated values derived from the methods of estimating the quantity of people according to the example embodiments described above exceed the actually-measured values of the actual quantity of people counted per fixed point by using cameras and the like, are unlikely to occur, even in cases in which the terminal detection rate varies from place to place or time to time. The reason for this is that this is a method to sequentially repeat the process of making estimates preferentially from information of higher terminal detection rates (that is, the quantity of people whose traveling paths are uncertain or whose proportion is small), and further deleting these estimation results from the whole. In other words, this is a processing flow, which makes it possible to determine from information of higher reliability (information with smaller error), in order, and in which, the range of estimation is narrowed (the error becomes relatively small) when estimating information of lower reliability (information that may have significant error), and in which therefore contradictions are unlikely to occur.

6. Other Embodiments

Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.

For example, the steps in the processes described in the Specification do not necessarily have to be executed in chronological order according to the order described in the sequence diagram. For example, the steps in the processes may be executed in an order different from the order illustrated in the sequence diagram, or may be executed in parallel. Also, some of the steps in the processes may be deleted, or additional steps may be attached to the processes.

Some of or all of the example embodiments can be described as in the following supplementary notes, but are not limited to the following.

(Supplementary Note 1)

An object quantity estimation system comprising:

a terminal path estimation unit configured to estimate information related to traveling paths of wireless terminals;

an object quantity counting unit configured to count a quantity of objects that are located in each of a plurality of fixed points;

a terminal detection rate calculation unit configured to calculate a terminal detection rate that indicates a relationship between a quantity of the wireless terminals and the quantity of objects, based on the information related to the traveling paths of the wireless terminals, for each of the plurality of fixed points; and an object quantity estimation unit configured to determine priorities of the traveling paths, each of which passes at least one of the plurality of fixed points, and sequentially estimate the quantity of objects having traveled on each traveling path, in descending order of the priorities of the traveling paths, based on the terminal detection rates.

(Supplementary Note 2)

The object quantity estimation system according to supplementary note 1, wherein the object quantity estimation unit estimates the quantity of objects from a path including a fixed point where the terminal detection rate is high.

(Supplementary Note 3)

The object quantity estimation system according to supplementary notes 1 or 2, wherein the object quantity estimation unit estimates the quantity of objects from a traveling path where the quantity of objects can be determined uniquely.

(Supplementary Note 4)

The object quantity estimation system according to one of supplementary notes 1 to 3, wherein the object quantity estimation unit repeats a process of deleting information related to estimated-traveling paths where the quantity of objects has been estimated, and sequentially estimating the quantity of objects.

(Supplementary Note 5)

The object quantity estimation system according to supplementary note 4, wherein the object quantity estimation system includes a terminal detection rate recalculation unit that repeats a process of sequentially calculating the terminal detection rate by recalculating the terminal detection rate for each of one or more fixed points not included in the information related to the estimated-traveling paths.

(Supplementary Note 6)

The object quantity estimation system according to any one of supplementary notes 1 to 5, wherein the terminal detection rate calculation unit calculates a proportion of the quantity of the wireless terminals based on the information related to the traveling paths of the wireless terminals to the quantity of objects counted in the object quantity counting unit, as the terminal detection rate.

(Supplementary Note 7)

The object quantity estimation system according to any one of supplementary notes 1 to 5, wherein the terminal detection rate calculation unit calculates a difference between the quantity of the wireless terminals based on the information related to the traveling paths of the wireless terminals and the quantity of objects counted in the object quantity counting unit, as the terminal detection rate.

(Supplementary Note 8)

The object quantity estimation system according to any one of supplementary notes 1 to 7, wherein the terminal path estimation unit estimates the information related to the traveling paths of the wireless terminals by using received signal strength acquired by a plurality of radio wave sensors.

(Supplementary Note 9)

The object quantity estimation system according to any one of supplementary notes 1 to 8, wherein the object quantity counting unit counts the quantity of objects based on image analysis or video analysis using an image or a video acquired by cameras.

(Supplementary Note 10)

The object quantity estimation system according to any one of supplementary notes 1 to 9, wherein the quantity of objects is an actual quantity of people.

(Supplementary Note 11)

An object quantity estimation method comprising:

estimating information related to traveling paths of wireless terminals;

counting a quantity of objects that are located in each of a plurality of fixed points;

calculating a terminal detection rate that indicates a relationship between a quantity of the wireless terminals and the quantity of objects, based on the information related to the traveling paths of the wireless terminals, for each of the plurality of fixed points; and determining priorities of the traveling paths, each of which passes at least one of the plurality of fixed points, and sequentially estimating the quantity of objects having traveled on each traveling path, in descending order of the priorities of the traveling paths, based on the terminal detection rates.

(Supplementary Note 12)

A program that causes a processor to execute:

estimating information related to traveling paths of wireless terminals;

counting a quantity of objects that are located in each of a plurality of fixed points;

calculating a terminal detection rate that indicates a relationship between a quantity of the wireless terminals and the quantity of objects, based on the information related to the traveling paths of the wireless terminals, for each of the plurality of fixed points; and determining priorities of the traveling paths, each of which passes at least one of the plurality of fixed points, and sequentially estimating the quantity of objects having traveled on each traveling path, in descending order of the priorities of the traveling paths, based on the terminal detection rates.

(Supplementary Note 13)

A non-transitory computer-readable recording medium storing a program that causes a processor to execute:

estimating information related to traveling paths of wireless terminals;

counting a quantity of objects that are located in each of a plurality of fixed points;

calculating a terminal detection rate that indicates a relationship between a quantity of the wireless terminals and the quantity of objects, based on the information related to the traveling paths of the wireless terminals, for each of the plurality of fixed points; and determining priorities of the traveling paths, each of which passes at least one of the plurality of fixed points, and sequentially estimating the quantity of objects having traveled on each traveling path, in descending order of the priorities of the traveling paths, based on the terminal detection rates.

This application claims the priority on the basis of Japanese Patent Application No. 2018-112965, filed on Jun. 13, 2018, and the disclosure including the Specification, drawings and abstract, is incorporated herein by reference in its entirety.

INDUSTRIAL APPLICABILITY

Even if there is an area where the count of the quantity of objects is small, it is possible to estimate the quantity of objects with high accuracy.

REFERENCE SIGNS LIST 100, 101 Quantity-of-people estimation system
102 Object quantity estimation system
20, 320 Terminal path estimation unit
30 Actual quantity-of-people counting unit
40, 41, 340 Terminal detection rate calculation unit
50, 51 Actual quantity-of-people estimation unit
330 Object quantity counting unit
350 Object quantity estimation unit

What is claimed is:

1. An object quantity estimation system comprising:
one or more processors configured to execute instructions to:
estimate information related to traveling paths of wireless terminals;
count a quantity of objects that are located in each of a plurality of fixed points;
calculate a terminal detection rate that indicates a relationship between a quantity of the wireless terminals and the quantity of objects, based on the information related to the traveling paths of the wireless terminals, for each of the plurality of fixed points; and
determine priorities of the traveling paths, each of which passes at least one of the plurality of fixed points, and sequentially estimate the quantity of objects having traveled on each traveling path, in descending order of the priorities of the traveling paths, based on the terminal detection rates.

2. The object quantity estimation system according to claim 1, wherein the one or more processors configured to execute instructions to estimate the quantity of objects from a path including a fixed point where the terminal detection rate is high.

3. The object quantity estimation system according to claim 1, wherein the one or more processors configured to execute instructions to estimate the quantity of objects from a traveling path where the quantity of objects can be determined uniquely.

4. The object quantity estimation system according to claim 1, wherein the one or more processors configured to execute instructions to repeat a process of deleting information related to estimated-traveling paths where the quantity of objects has been estimated, and sequentially estimating the quantity of objects.

5. The object quantity estimation system according to claim 4, wherein the one or more processors configured to execute instructions to repeat a process of sequentially calculating the terminal detection rate by recalculating the terminal detection rate for each of one or more fixed points not included in the information related to the estimated-traveling paths.

6. The object quantity estimation system according to claim 1, wherein the one or more processors configured to execute instructions to calculate a proportion of the quantity of the wireless terminals based on the information related to the traveling paths of the wireless terminals to the quantity of objects counted in the object quantity counting unit, as the terminal detection rate.

7. The object quantity estimation system according to claim 1, wherein the one or more processors configured to execute instructions to calculate a difference between the quantity of the wireless terminals based on the information related to the traveling paths of the wireless terminals and the quantity of objects counted in the object quantity counting unit, as the terminal detection rate.

8. The object quantity estimation system according to claim 1, wherein the one or more processors configured to execute instructions to estimate the information related to the traveling paths of the wireless terminals by using received signal strength acquired by a plurality of radio wave sensors.

9. The object quantity estimation system according to claim 1, wherein the one or more processors configured to execute instructions to count the quantity of objects based on image analysis or video analysis using an image or video acquired by cameras.

10. The object quantity estimation system according to claim 1, wherein the quantity of objects is an actual quantity of people.

11. An object quantity estimation method comprising:
estimating information related to traveling paths of wireless terminals;
counting a quantity of objects that are located in each of a plurality of fixed points;
calculating a terminal detection rate that indicates a relationship between a quantity of the wireless terminals and the quantity of objects, based on the information related to the traveling paths of the wireless terminals, for each of the plurality of fixed points; and
determining priorities of the traveling paths, each of which passes at least one of the plurality of fixed points, and sequentially estimating the quantity of objects having traveled on each traveling path, in descending order of the priorities of the traveling paths, based on the terminal detection rates.

12. A non-transitory computer-readable recording medium storing a program that causes a processor to execute:
estimating information related to traveling paths of wireless terminals;
counting a quantity of objects that are located in each of a plurality of fixed points;
calculating a terminal detection rate that indicates a relationship between a quantity of the wireless terminals and the quantity of objects, based on the information related to the traveling paths of the wireless terminals, for each of the plurality of fixed points; and
determining priorities of the traveling paths, each of which passes at least one of the plurality of fixed points, and sequentially estimating the quantity of objects having traveled on each traveling path, in descending order of the priorities of the traveling paths, based on the terminal detection rates.

* * * * *